(12) United States Patent
Choi

(10) Patent No.: US 11,882,331 B2
(45) Date of Patent: Jan. 23, 2024

(54) ELECTRONIC DEVICE AND OPERATING METHOD THEREOF

(71) Applicant: Samsung Electronics Co., Ltd., Suwon-si (KR)

(72) Inventor: Byoungjin Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/727,150

(22) Filed: Apr. 22, 2022

(65) Prior Publication Data
US 2022/0345773 A1 Oct. 27, 2022

Related U.S. Application Data

(63) Continuation of application No. PCT/KR2022/005788, filed on Apr. 22, 2022.

(30) Foreign Application Priority Data

Apr. 23, 2021 (KR) .................. 10-2021-0053102

(51) Int. Cl.
*H04N 21/4363* (2011.01)
*H04N 21/435* (2011.01)
(Continued)

(52) U.S. Cl.
CPC ... *H04N 21/4358* (2013.01); *H04N 21/43635* (2013.01); *H04N 21/4436* (2013.01); *H04N 21/84* (2013.01)

(58) Field of Classification Search
None
See application file for complete search history.

(56) References Cited

U.S. PATENT DOCUMENTS

| 8,069,276 B2 * | 11/2011 | Kang .................. G09G 5/006 345/1.3 |
| 2005/0120384 A1 * | 6/2005 | Stone .................. G06F 8/60 725/50 |

(Continued)

FOREIGN PATENT DOCUMENTS

| CN | 112367556 A | * | 2/2021 |
| JP | 2004-333932 | | 11/2004 |

(Continued)

OTHER PUBLICATIONS

International Search Report and Written Opinion of the International Searching Authority dated Jul. 26, 2022 for International Application No. PCT/KR2022/005788.

*Primary Examiner* — William J Kim
(74) *Attorney, Agent, or Firm* — STAAS & HALSEY LLP

(57) ABSTRACT

An electronic device and an operating method thereof. The electronic device includes a receiver for connection to a source device, a memory storing one or more instructions, and a processor configured to execute the one or more instructions stored in the memory to detect a first resolution of an input image received from the source device, determine whether to modify extended display identification data (EDID) of the electronic device, based on whether the detected first resolution corresponds to the EDID, upon determining that the EDID is to be modified, modify the EDID, and receive, from the source device, an input image of a second resolution, generated based on the modified EDID.

27 Claims, 18 Drawing Sheets

(51) Int. Cl.
  *H04N 21/84* (2011.01)
  *H04N 21/443* (2011.01)

(56) References Cited

U.S. PATENT DOCUMENTS

| | | | |
|---|---|---|---|
| 2008/0129882 A1* | 6/2008 | Moriyama | G06F 3/14 386/E5.07 |
| 2009/0058868 A1* | 3/2009 | Kang | G09G 5/006 345/581 |
| 2011/0080485 A1* | 4/2011 | Kimoto | H04N 23/667 348/192 |
| 2012/0038655 A1* | 2/2012 | Kang | G09G 5/006 345/530 |
| 2017/0013231 A1 | 1/2017 | Kwon | |
| 2017/0132749 A1* | 5/2017 | Lim | G06T 1/20 |
| 2017/0195722 A1* | 7/2017 | Seo | H04N 21/440218 |
| 2017/0280184 A1 | 9/2017 | Kozuka et al. | |
| 2020/0382753 A1* | 12/2020 | Nakajima | H04N 5/42 |
| 2021/0185304 A1* | 6/2021 | Kim | H04N 17/045 |
| 2021/0327392 A1 | 10/2021 | Frederick et al. | |
| 2022/0036854 A1 | 2/2022 | Oh | |

FOREIGN PATENT DOCUMENTS

| | | |
|---|---|---|
| JP | 6447934 B2 | 1/2019 |
| KR | 10-0841434 | 6/2008 |
| KR | 10-2009-0132722 | 12/2009 |
| KR | 10-2014-0021190 | 2/2014 |
| KR | 10-2017-0006576 | 1/2017 |
| KR | 10-2019-0122768 | 10/2019 |
| KR | 10-2020-0132541 | 11/2020 |

* cited by examiner

US 11,882,331 B2

ELECTRONIC DEVICE AND OPERATING METHOD THEREOF

CROSS-REFERENCE TO RELATED APPLICATION(S)

This application is a continuation application, under 35 U.S.C. § 111(a), of International Application No. PCT/KR2022/005788, filed Apr. 22, 2022, which is based on and claims priority under 35 U.S.C. § 119 to Korean Patent Application No. 10-2021-0053102, filed on Apr. 23, 2021 in the Korean Intellectual Property Office, the disclosures of which are incorporated herein by reference.

BACKGROUND

1. Field

The disclosure relates to an electronic device and an operating method thereof, and more particularly, to an electronic device capable of receiving a higher-resolution image from a source device by providing extended display identification data (EDID) automatic compatibility, and an operating method for the electronic device.

2. Description of Related Art

A display device may store extended display identification data (EDID) to inform a source device of video/audio format specification information supported by the display device. The display device may be connected to the source device which provides content, and provide the stored EDID to the source device upon a request from the source device. The source device having received the EDID may process content in a format based on the EDID provided from the display device, and provide the processed content to the display device.

Most display devices in the market use EDID according to the existing standard. However, video/audio format specifications supported by high-resolution/high-frequency display devices may not be fully represented using the existing EDID, and the high-resolution/high-frequency display devices may use EDID according to a new standard. Nevertheless, existing source devices may not recognize such EDID according to the new standard and thus even display devices supporting high-resolution/high-frequency content formats may receive low-quality content from the source devices.

SUMMARY

According to an embodiment of the disclosure, an electronic device includes a receiver configured to receive information including an input image from a source device, a memory storing one or more instructions, and a processor configured to execute the one or more instructions stored in the memory to detect a first resolution of the input image received from the source device, determine whether to modify an extended display identification data (EDID) of the electronic device, based on whether the detected first resolution corresponds to at least one supported resolution associated with the EDID of the electronic device, upon determining that the EDID is to be modified, modify the EDID, and receive, from the source device, an input image of a second resolution, generated based on the modified EDID.

The processor may be further configured to execute the one or more instructions to, upon determining that the detected first resolution does not correspond to the at least one supported resolution associated with the EDID, determine that the EDID is to be modified, and, upon determining that the detected first resolution corresponds to the at least one supported resolution associated with the EDID, output the received input image of the first resolution on a display without modifying the EDID.

The processor may be further configured to execute the one or more instructions to modify the EDID by changing a number of data blocks included in the EDID, to a preset number.

The EDID may include a base EDID block and one or more EDID extension blocks, and the processor may be further configured to execute the one or more instructions to change the number of data blocks included in the EDID, to the preset number, by removing one or more EDID extension blocks from among the data blocks included in the EDID.

The processor may be further configured to execute the one or more instructions to generate an updated base EDID block by modifying a first preferred resolution information written in the base EDID block, to a second preferred resolution information.

A value of a data field included in the updated base EDID block and indicating a number of EDID extension blocks that are changed when the one or more EDID extension blocks are removed.

The processor may be further configured to execute the one or more instructions to, upon completing modification of the EDID, provide, to the source device, a state signal for controlling the source device to read the modified EDID, and, upon receiving an EDID request from the source device, receive, from the source device, the input image of the second resolution, generated based on the modified EDID, by providing the modified EDID to the source device.

The processor may be further configured to execute the one or more instructions to, upon receiving the input image of the second resolution from the source device, release a display screen mute state and display the received input image of the second resolution on a display.

The processor may be further configured to execute the one or more instructions to, upon detecting a preset event, restore the modified EDID to the EDID.

The preset event may include at least one of disconnection of a cable for connecting the source device to the electronic device, entry to a power management mode, or reception of a power off input.

The input image of the first resolution, received from the source device, may be generated by processing an image based on the first resolution set by default when the source device having read the EDID fails to parse the EDID.

The processor may be further configured to execute the one or more instructions to determine that the EDID is not to be modified, when it is determined that the detected first resolution corresponds to the at least one supported resolution associated with the EDID, and release a display screen mute state and display the received input image of the first resolution on a display.

The first resolution may indicate a low resolution including at least one of 480p or 576p, and the second resolution may be higher than the first resolution.

According to an embodiment of the disclosure, an operating method of an electronic device includes detecting a first resolution of an input image received from a source device, determining whether to modify an extended display identification data (EDID) of the electronic device, based on whether the detected first resolution corresponds to at least one supported resolution associated with the EDID of the electronic device, upon determining that the EDID is to be modified, modifying the EDID, and receiving, from the source device, an input image of a second resolution, generated based on the modified EDID.

According to an embodiment of the disclosure, a non-transitory computer-readable recording medium having recorded thereon one or more programs executed by a processor of an electronic device to implement an operating method of the electronic device, the operating method comprising detecting a first resolution of an input image received from a source device, determining whether to modify an extended display identification data (EDID) of the electronic device, based on whether the detected first resolution corresponds to at least one supported resolution associated with the EDID of the electronic device, upon determining that the EDID is to be modified, modifying the EDID, and receiving, from the source device, an input image of a second resolution, generated based on the modified EDID.

BRIEF DESCRIPTION OF THE DRAWINGS

The above and other aspects, features, and advantages of certain embodiments of the present disclosure will be more apparent from the following description taken in conjunction with the accompanying drawing, in which.

DETAILED DESCRIPTION

Figure 1:
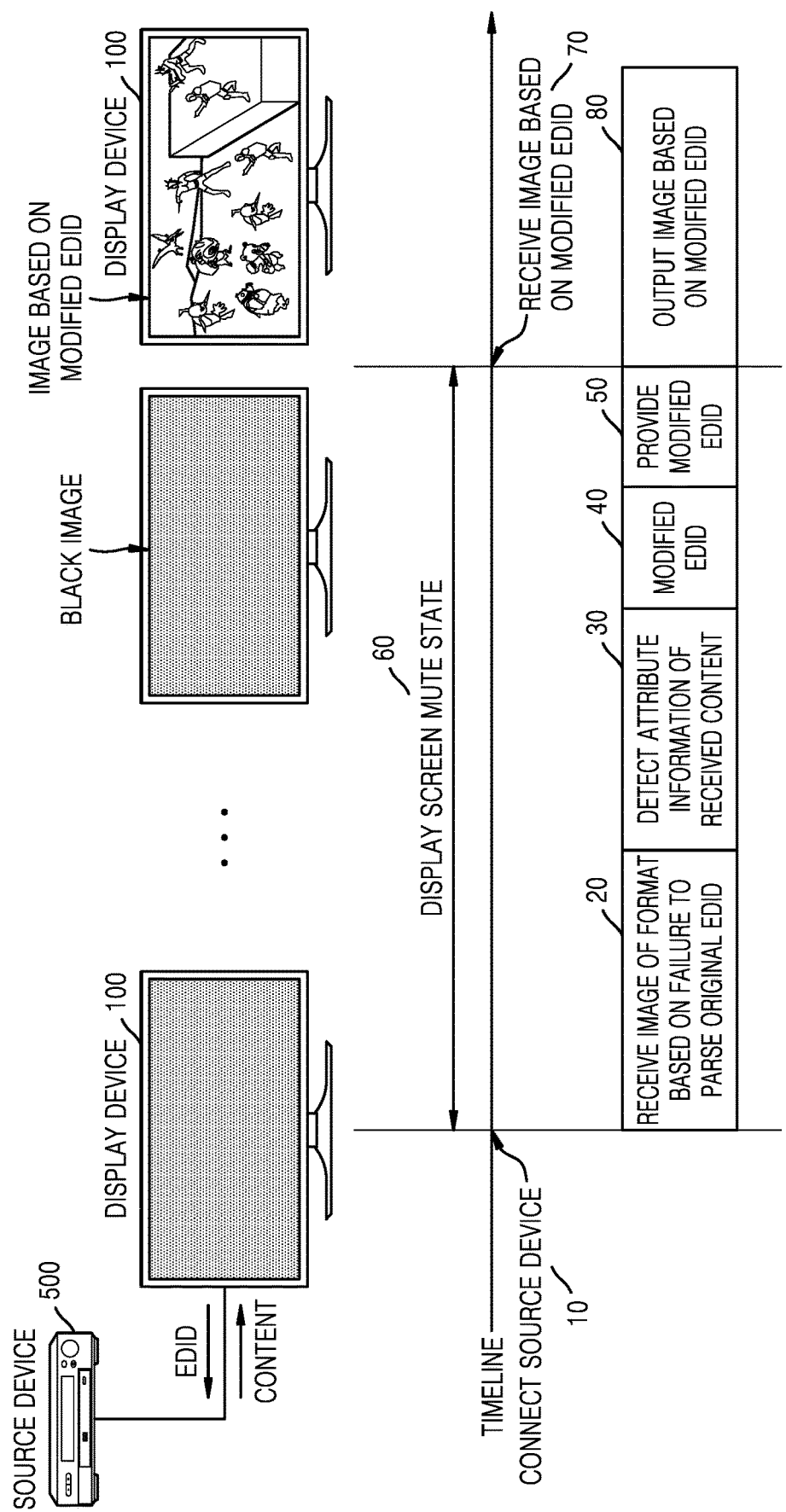
FIG. 1 is a reference view for describing the concept of a method for a display device to receive an image of an optimal format by providing extended display identification data (EDID) usable by a source device, according to embodiments of the disclosure.

Throughout the disclosure, the expression "at least one of a, b or c" indicates only a, only b, only c, both a and b, both a and c, both b and c, all of a, b, and c, or variations thereof.

Terminology used in this specification will now be briefly described before describing embodiments of the disclosure in detail.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in that case, the meanings of these terms may be described in relevant parts of the disclosure. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein. In the drawings, parts not related to the disclosure are not illustrated for clarity of explanation, and like reference numerals denote like elements throughout.

As used herein, the term "user" refers to a person who controls function or operation of a computing device or an electronic device, and may include a viewer, a manager, or an installer.

The disclosure provides an electronic device capable of receiving a higher-resolution image from a source device by providing extended display identification data (EDID) automatic compatibility, and an operating method for the electronic device.

According to various embodiments of the disclosure, extended display identification data (EDID) compatibility may be automatically enhanced between EDID-incompatible devices without user intervention.

FIG. 1 is a reference view for describing the concept of a method for a display device 100 to receive an image of an optimal format by providing extended display identification data (EDID) usable by a source device 500, according to embodiments of the disclosure.

Referring to FIG. 1, a system may include the source device 500 and the display device 100.

The source device 500 may provide content such as video and audio to the display device 100. The source device 500 may include various types of electronic devices capable of providing content to the display device 100, e.g., a set-top box, a digital versatile disc (DVD) player, a Blu-ray disc player, a personal computer (PC), and a video game console. The source device 500 may be called a source device because it provides content, and also be called a host device, a content providing device, an electronic device, a computing device, or the like.

The display device 100 may output or display the content received from the source device 500. The display device 100 may include various types of electronic devices capable of receiving and outputting content, e.g., a network television (TV), a smart TV, an Internet TV, a web TV, an Internet protocol television (IPTV), and a PC. The display device 100 may be called a display device because it receives and displays content, and also be called a content receiving device, a sink device, an electronic device, a computing device, or the like.

The source device 500 may be connected to the display device 100 through various connection means to transmit and receive content therebetween. The various connection means may include, for example, a cable, and the source device 500 and the display device 100 may include one or more ports for connection through the cable. The one or more ports may include, for example, a high-definition multimedia interface (HDMI) port, a DisplayPort port, and a digital input interface such as type-C. For example, each of the source device 500 and the display device 100 may include an HDMI port to communicate therethrough. To provide content to the display device 100, the source device 500 may initially receive EDID provided from the display device 100, generate content of a format corresponding to the received EDID, and provide the content to the display device 100. The EDID may be information defining display performance or display capability of the display device 100 to display content, and include, for example, timing information and resolution information. Therefore, the source device 500 may generate content to be sent to the display device 100, in a format based on the timing information and the resolution information defined by the EDID provided by the display device 100, and provide the content to the display device 100. For example, when the EDID provided by the display device 100 defines that a high resolution is processable, the source device 500 may provide high-resolution content to the display device 100 and, when the EDID provided by the display device 100 defines that a low resolution is processable, the source device 500 may provide low-resolution content to the display device 100. Based on the EDID, the source device 500 may provide the display device 100 with content of a format suitable for the display performance of the display device 100.

Because the EDID includes one mandatory base data block but has an expandable data block structure, the display device 100 may store the EDID including one or more data blocks to support high resolutions/high frequencies. However, some source devices in the market may not properly parse the EDID having an extended data block structure to support high resolutions/high frequencies, and thus output low-resolution content set by default or output a digital visual interface (DVI) signal having no audio signal. Therefore, to solve the above problem, the display device 100 according to embodiments of the disclosure may provide the EDID to the source device 500 by modifying the EDID to EDID parsable by the source device 500, and thus receive, from the source device 500, content better corresponding to the display performance supported by the display device 100.

Referring to FIG. 1, when the display device 100 is connected to the source device 500 through ports (operation 10), the source device 500 may read original EDID stored in the display device 100, generate content of a format based on the read original EDID, and provide the content to the display device 100. In this case, when the original EDID has an extended data block structure and thus the source device 500 fails to parse the original EDID, the source device 500 may process content, for example, in a low-resolution format set by default for a case when parsing fails, and provide the content to the display device 100 (operation 20).

According to an embodiment of the disclosure, when the content is received from the source device 500, the display device 100 may detect attribute information of the received content (operation 30), and determine whether the detected attribute information corresponds to the original EDID of the display device 100. The display device 100 may determine whether the attribute information detected from the received content corresponds to the original EDID, in various manners. For example, the display device 100 may determine whether the attribute information corresponds to the original EDID, based on resolution information or timing information detected from the received content. Alternatively, the display device 100 may determine whether the attribute information corresponds to the original EDID, when the received content is a signal having no audio signal, e.g., a DVI signal. According to an example, the display device 100 may determine whether the resolution information detected from the received content corresponds to preferred resolution information written in the original EDID. For example, the display device 100 may determine whether the resolution information corresponds to the original EDID, when a resolution lower than or equal to a standard-definition (SD) level (e.g., 480p or 576p) is detected from a received input image. According to another example, the display device 100 may determine whether the timing information detected from the received content corresponds to preferred timing information written in the original EDID.

According to an embodiment of the disclosure, when it is determined that the attribute information detected from the received content corresponds to the original EDID, the display device 100 may release a display screen mute state thereof and output, on a display, the content received from the source device 500.

According to an embodiment of the disclosure, when it is determined that the attribute information detected from the received content does not correspond to the original EDID, the display device 100 may modify the original EDID (operation 40), and provide the modified EDID to the source device 500 by controlling the source device 500 to read the modified EDID again (operation 50). For example, the display device 100 may modify the original EDID having an extended data block structure to EDID having a data block structure parsable by the source device 500. For example, the display device 100 may generate modified EDID by reconfiguring the original EDID including three or four data blocks, to two data blocks. The display device 100 may modify the EDID, and control the source device 500 to read the modified EDID again, by providing the source device 500 with a control signal instructing the source device 500 to read the modified EDID again.

According to an embodiment of the disclosure, the source device 500 may read and parse the modified EDID, process content in a format based on performance information of the display device 100 included in the modified EDID, and provide the content to the display device 100.

According to an embodiment of the disclosure, the display device 100 may receive the content based on the modified EDID (operation 70), and output the content based on the modified EDID on the display by releasing the display screen mute state when synchronization of the content signal is stabilized (operation 80). Specifically, the display device 100 may determine whether the content initially received from the source device 500 corresponds to the EDID of the display device 100, and immediately releases the display screen mute state and outputs the content when it is determined that the content corresponds to the EDID. When it is determined that the content received from the source device 500 does not correspond to the EDID of the display device 100, the display device 100 may modify the EDID, and maintain the display screen mute state until content reformatted based on the modified EDID is received again (operation 60). When the content reformatted based on the modified EDID is received, the display device 100 may output the content of the format based on the modified EDID, by releasing the display screen mute state (operation 80). The display screen mute state may indicate a state in which a black image is output on a display screen of the display device 100.

As described above, although the source device 500 fails to parse original EDID of the display device 100 and thus transmits a preset low-resolution image to the display device 100, when it is determined that an attribute analyzed in the image received from the source device 500 does not correspond to the EDID of the display device 100, the display device 100 may actively modify the original EDID to generate modified EDID in a structure parsable by the source device 500, control the source device 500 to read the modified EDID, and thus receive and output an image corresponding to the EDID of the display device 100. In addition, by maintaining a display screen mute state until the image based on the modified EDID is received, the display device 100 may prevent a user from noticing the image re-reception procedure due to the EDID modification operation, thereby minimizing user inconvenience caused by the EDID modification operation.

Figure 2:
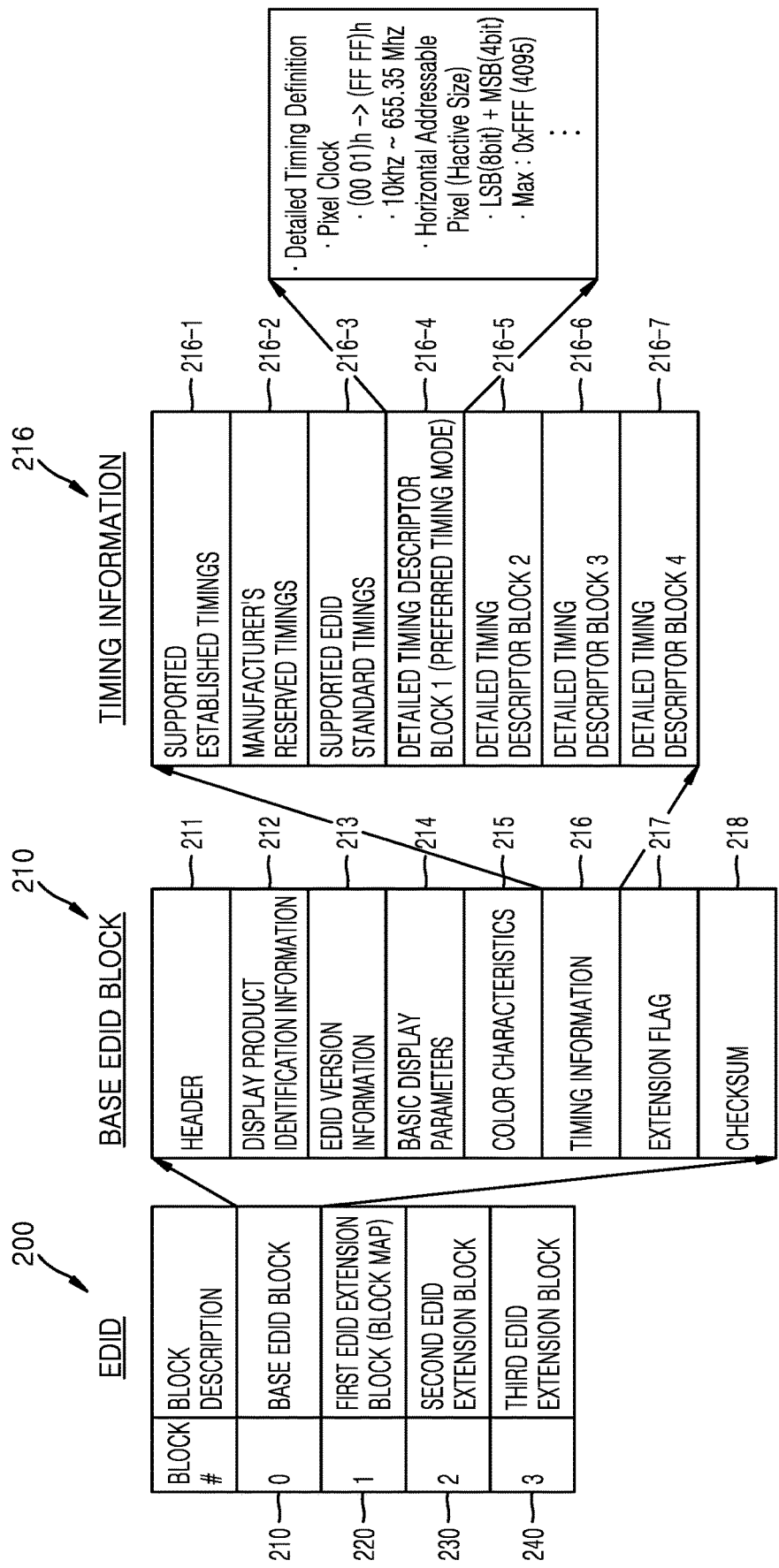
FIG. 2 shows an EDID structure according to an example.

FIG. 2 shows an EDID structure according to an example.

Extended display identification data (EDID) is a standardized means for a display device to provide display performance information thereof to a source device. Using the EDID, the display device may provide operational characteristics such as a native resolution or a preferred resolution to the source device connected thereto, and control the source device to generate content in a format that satisfies requirements of the display device.

To include information based on high-resolution/high-frequency specification enhancement of the display device, the EDID may include one or more data blocks to have an expandable structure. For example, the EDID may include one base EDID block and one or more EDID extension blocks. Referring to FIG. 2, EDID 200 may include four blocks, i.e., a base EDID block 210, a first EDID extension block 220, a second EDID extension block 230, and a third EDID extension block 240. The first block, i.e., the base EDID block, may be a mandatory block and have, for example, EDID version 1.3 or higher. The base EDID block 210 may also be called a Video Electronics Standards Association (VESA) block. The second block, i.e., the first EDID extension block 220, may serve as an extension block or indicate a block map. For example, when the EDID 200 includes a total of two blocks, the first EDID extension block 220 may serve as an extension block and, when the EDID 200 includes three or more blocks, the first EDID extension block 220 may indicate a block map including information about extension blocks.

The base EDID block 210 may include a header 211 provided as a fixed pattern indicating an EDID file, display product identification information 212, EDID version information 213, basic display parameters 214 defining characteristics such as video input type (analog or digital) of the display device, synchronization type, maximum horizontal and vertical sizes of the display, gamma transfer characteristics, power management function, color space, and basic video timing, color characteristics 215 defining RGB color space conversion technology used by the display device, timing information 216 of a resolution supported by the display device, an extension flag 217 indicating the number of usable additional extension blocks, and a checksum 218.

The timing information 216 may include, for example, supported established timings 216-1, manufacturer's reserved timings 216-2, supported EDID standard timings 216-3, detailed timing descriptor block 1 216-4, detailed timing descriptor block 2 216-5, detailed timing descriptor block 3 216-6, and detailed timing descriptor block 4 216-7. The detailed timing descriptor block 1 216-4 may define a video timing mode set by the display manufacturer to achieve the best quality for a display screen, i.e., a preferred timing mode.

A pixel clock included in the detailed timing descriptor block 1 216-4 of the base EDID block 210 may express up to 655.35 MHz, and horizontal addressable pixels may be set to express up to 4095 pixels. Therefore, when a pixel clock of an input signal exceeds 655.35 MHz or when the display device is a high-resolution/high-frequency display device having a horizontal screen size greater than 4095 pixels, because the pixel clock or the panel size exceeds the range writable in the existing base EDID block 210 and thus the existing 2-block EDID may not include accurate display resolution information. That is, in this case, high-resolution/high-frequency information may not be written in a base EDID block and thus additional extension blocks may be required. Therefore, because the display device needs to use, for example, EDID extension blocks to write high-resolution/high-frequency information, an HDMI port using EDID version 1.3 may use 4-block EDID and a DisplayPort port using EDID version 1.4 may use 3-block EDID.

Figure 3:
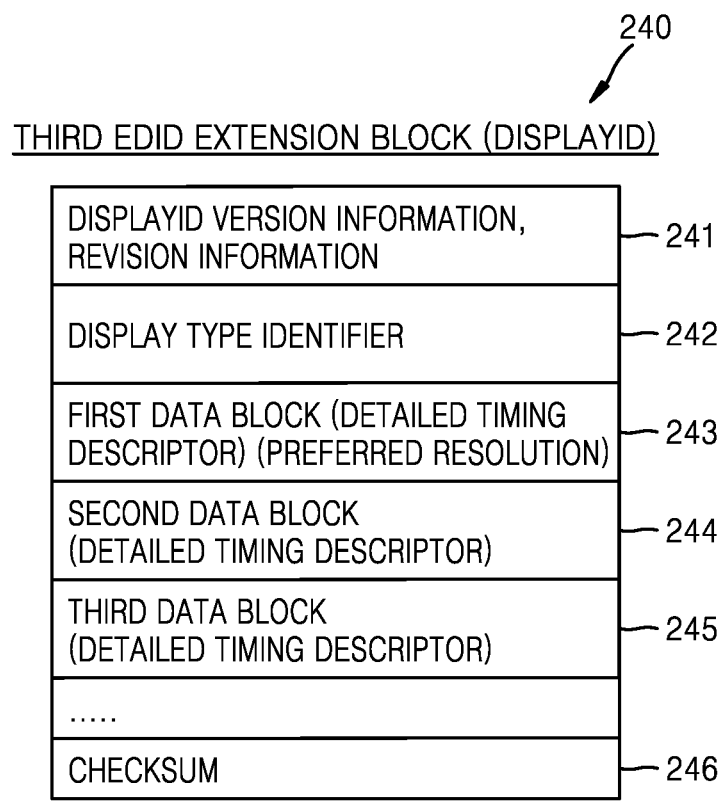
FIG. 3 shows a third EDID extension block according to an example.

FIG. 3 shows the third EDID extension block 240 according to an example.

Referring to FIG. 3, the third EDID extension block 240 may include DisplayID version information and revision information 241, a display type identifier 242, a first data block 243 including a detailed timing descriptor, a second data block 244 including a detailed timing descriptor, a third data block 245 including a detailed timing descriptor, and a checksum 246. One or more of the data blocks included in the third EDID extension block 240 may be used to define preferred timing information.

According to an embodiment of the disclosure, in an EDID structure including a base EDID block and the third EDID extension block 240, timing information priority may be determined in the order of a preferred timing mode of the base EDID, a detailed timing mode of the base EDID, and an additional detailed timing mode defined in the extension block 240.

Figure 4:
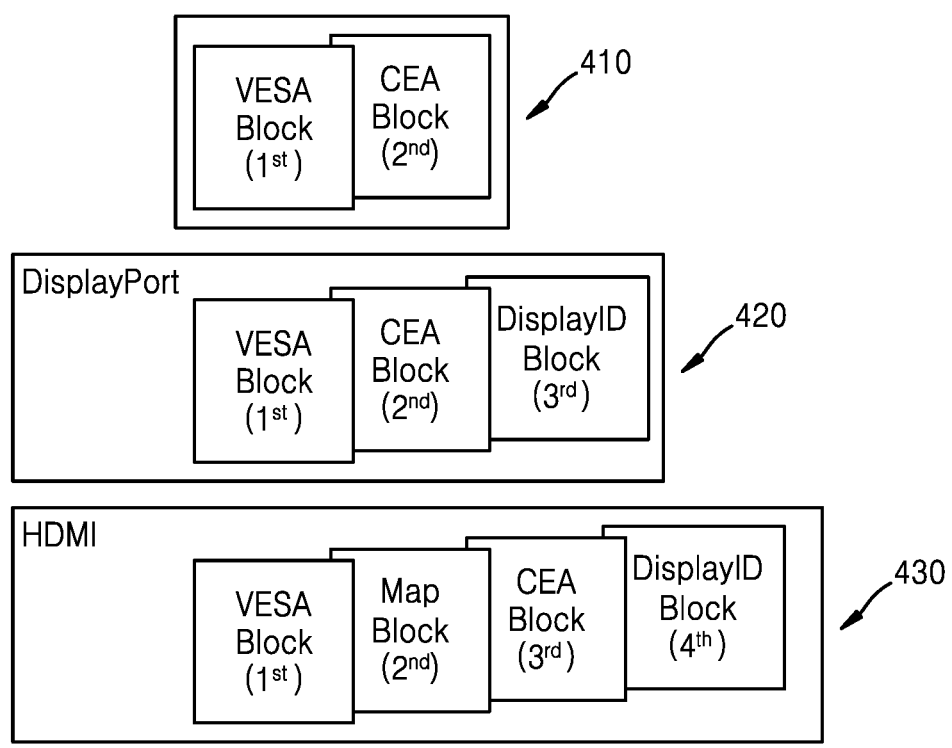
FIG. 4 shows 2-block EDID, 3-block EDID, and 4-block EDID, according to an example.

FIG. 4 shows 2-block EDID 410, 3-block EDID 420, and 4-block EDID 430, according to an example.

Referring to FIG. 4, the 2-block EDID 410 may include a base EDID block (e.g., a VESA block), and a Consumer Electronics Association (CEA) extension block (e.g., a CEA-861 block) defined to support high-level functions of a consumer device including an HDMI, and many audio/video (AV) source devices in the market are designed considering this 2-block EDID structure.

The 3-block EDID 420 may be used for a DisplayPort port using EDID version 1.4, and include a VESA block as a base EDID block, and a CEA block and a DisplayID block as EDID extension blocks.

The 4-block EDID 430 may be used for an HDMI port using EDID version 1.3, and include a VESA block as a base EDID block, and a Map block, a CEA block, and a DisplayID block as EDID extension blocks.

Many source devices, and more particularly, AV devices, may parse the 2-block EDID 410 but be likely to fail to parse the 3-block EDID 420 or the 4-block EDID 430.

When the DisplayID extension block is used to support high resolutions/high frequencies as described above, some AV devices in the market may not properly parse the DisplayID block or the Map block and thus output a low-resolution signal or a DVI signal that is an RGB signal with no audio. For example, according to the HDMI standard, when EDID parsing fails, an SD-level low-resolution signal, e.g., a 480p or 576p RGB video signal, is output. 480p may indicate a resolution of 480 vertical scan lines, e.g., 640×480p, 720×480p, or 800×480p. 576p may indicate a resolution of 576 vertical scan lines, e.g., 768×576p or 1024×576p. Therefore, when a display device uses EDID including an extension block such as a DisplayID block or a Map block, some AV source devices may fail to parse the EDID and output low-resolution content regardless of a preferred resolution set by the display device. Therefore, some display devices provide a user menu by which a user may manually modify EDID settings when the above problem occurs, but such a method may cause inconvenience to the user because the user needs to manually manipulate the display device to solve the problem. Therefore, according to embodiments of the disclosure, before a user of a display device faces a related problem, the display device may automatically determine a problem situation and modify EDID when EDID modification is required, thereby preventing misoperation of a source device. Because the display device automatically modifies the EDID in a mute state of a display screen thereof, the user may experience a slight screen latency and thus content of an appropriate resolution may be received from a source device and be output without causing serious inconvenience to the user.

Figure 5:
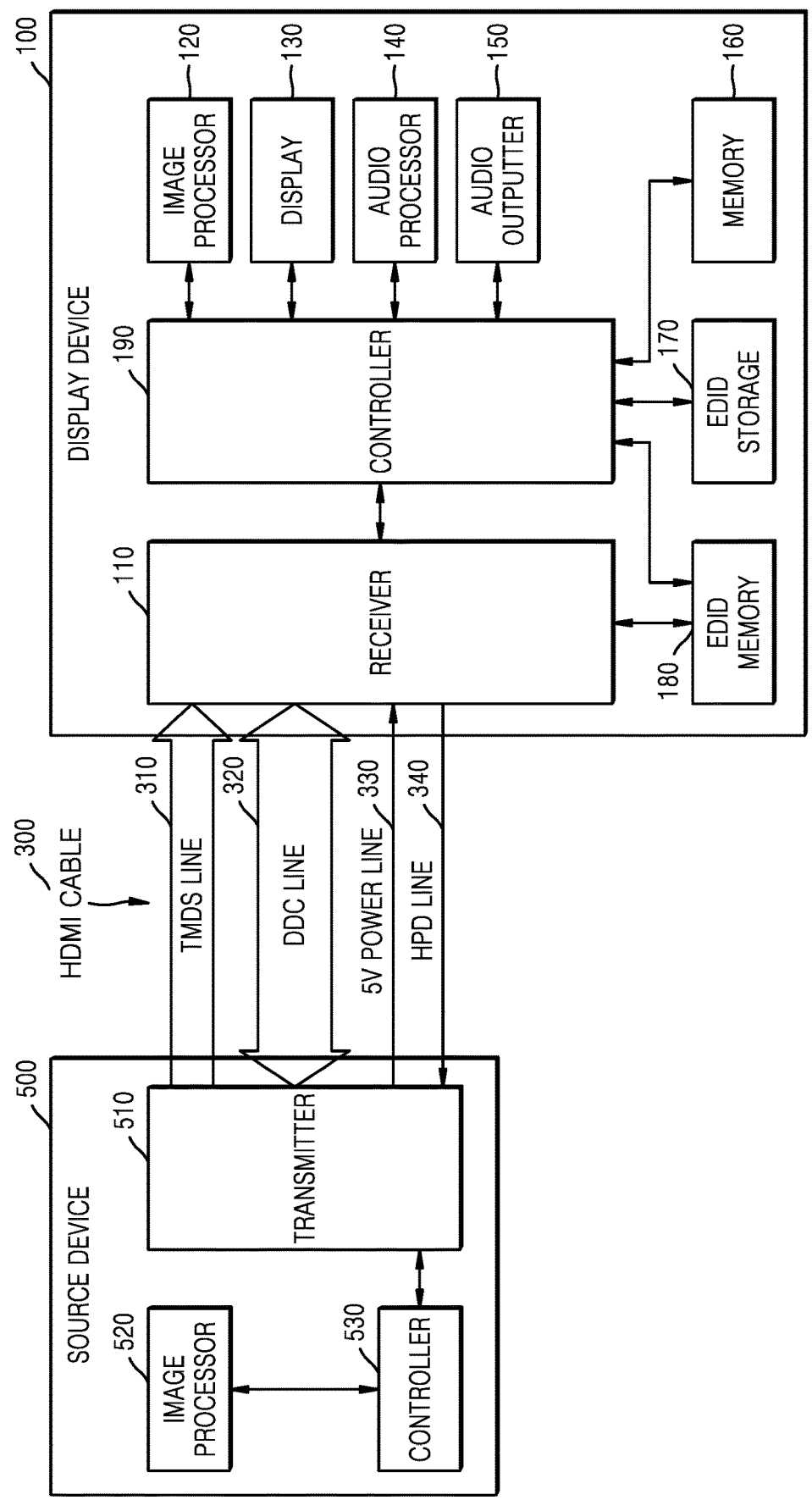
FIG. 5 is an example of a block diagram of a display device and a source device, according to an embodiment of the disclosure.

FIG. 5 is an example of a block diagram of the display device 100 and the source device 500, according to an embodiment of the disclosure.

Referring to FIG. 5, the source device 500 may include a transmitter 510, an image processor 520, and a controller 530.

The transmitter 510 may output an image signal of a resolution processable by the display device 100, and an audio signal of a sound format processable by the display device 100. In addition, the transmitter 510 may read, from the display device 100, EDID including display characteristics information including information about available resolutions or sound formats.

The transmitter 510 may include one or more ports to communicate with the display device 100. For example, the one or more ports may include ports according to various standards, e.g., an HDMI port, a DisplayPort (DP) port, a Thunderbolt port, a mobile high-definition link (MHL) port, and a universal serial bus (USB) port.

The image processor 520 may process an image to be transmitted through the transmitter 510, under the control by the controller 530.

The controller 530 may control overall operation of the source device 500, provide control to process image and audio signals to be transmitted to the display device 100, and provide control to output the processed image and audio signals through the transmitter 510.

According to an embodiment of the disclosure, the controller 530 may read the EDID including the display characteristics information from the display device 100, and control the image processor 520 to process an image based on the read EDID.

According to an embodiment of the disclosure, the controller 530 may read the EDID from the display device 100 when the source device 500 is connected to the display device 100, control the image processor 520 to process an image based on the read EDID, and control the processed image signal to be transmitted through the transmitter 510 to the display device 100. In this case, when the controller 530 fails to parse the read EDID and thus fails to obtain the display characteristics information included in the EDID, the controller 530 may provide control to output an image of a low resolution set by default or output an image signal having no audio signal.

When a control signal instructing to read the EDID again is received from the display device 100 in response to the output low-resolution image or the output image signal having no audio signal, the controller 530 may read the EDID from the display device 100 again, control the image processor 520 to process an image based on the reread EDID, and control the processed image signal to be transmitted through the transmitter 510 to the display device 100.

The display device 100 will now be described.

The display device 100 may process and output the image and audio signals received from the source device 500.

The display device 100 may include a receiver 110, an image processor 120, a display 130, an audio processor 140, an audio outputter 150, a memory 160, an EDID storage 170, an EDID memory 180, and a controller 190.

The receiver 110 may receive the image and audio signals from the source device 500 according to a connection protocol and output the image and audio signals to the image processor 120 and the audio processor 140 under the control by the controller 190.

The image processor 120 may process the image signal received from the receiver 110 and output the image signal to the display 130 under the control by the controller 190.

The display 130 may display, on a screen, the image signal received from the image processor 120.

The audio processor 140 may convert the audio signal received from the receiver 110, into an analog audio signal and output the analog audio signal to the audio outputter 150 under the control by the controller 190.

The audio outputter 150 may output the received analog audio signal through a speaker.

The memory 160 may store programs related to operation of the display device 100, and various types of data generated during the operation of the display device 100.

The EDID storage 170 may be a memory storing EDID, and store EDID including a manufacturer/product identifier, an EDID format version, and display characteristics information such as display parameters (e.g., supported resolutions and color formats) and audio formats. The EDID may be stored in the EDID storage 170 by a manufacturer when the display device 100 is produced. Flash memory may be used as the EDID storage 170.

The EDID storage 170 may store EDID corresponding to each of one or more ports included in the receiver 110 of the display device 100. For example, when the receiver 110 includes an HDMI port and a DisplayPort port, the EDID storage 170 may include EDID used for the HDMI port and EDID used for the DisplayPort port.

According to an embodiment of the disclosure, the controller 190 may write the EDID stored in the EDID storage 170, in the EDID memory 180 such that the EDID may be read by the source device 500. The EDID memory 180 from which the source device 500 may read the EDID may be implemented as electrically erasable programmable read-only memory (EEPROM).

According to an embodiment of the disclosure, to enhance EDID compatibility, the controller 190 may not write the EDID stored in the EDID storage 170, equally in the EDID memory 180, but may modify the EDID and write the modified EDID in the EDID memory 180. For distinction, the EDID stored when the display device 100 is produced may be called EDID or original EDID, and the EDID modified by the controller 190 for EDID compatibility may be called modified EDID.

According to an embodiment of the disclosure, the controller 190 may modify the original EDID and store the modified EDID in the EDID memory 180 whenever necessary to enhance EDID compatibility.

According to an embodiment of the disclosure, a plurality of pieces of EDID may be stored in the EDID storage 170 when the display device 100 is produced. That is, the plurality of pieces of EDID may include original EDID including display characteristics information for implementing the best performance of the display device 100, and one or more pieces of modified EDID including display characteristics information modified for EDID compatibility. When the plurality of pieces of EDID are stored in the EDID storage 170 as described above, the controller 190 may select and write appropriate EDID in the EDID memory 180 without modifying the EDID when the display device 100 operates, thereby reducing the burden on the controller 190. For example, the controller 190 may write the original EDID stored in the EDID storage 170, in the EDID memory 180 in a normal operation of the display device 100, and write the modified EDID stored in the EDID storage 170, in the EDID memory 180 in a specific situation. The specific situation may be, for example, a case when the source device 500 may not parse the original EDID of the display device 100.

The controller 190 may control overall operation of the display device 100, and provide control to process the digital image and audio signals transmitted from the source device 500, and display and output the image and audio signals on the display 130 and through the audio outputter 150.

According to an embodiment of the disclosure, the controller 190 may detect attribute information from the image received from the source device 500, and modify the EDID when the detected attribute information does not correspond to the EDID provided by the display device 100. When the attribute information detected from the image does not correspond to the EDID provided by the display device 100, it may indicate that the attribute information of the image received from the source device 500 does not agree with the display performance of the display device 100. For example, although the display device 100 provides EDID including display characteristics information indicating that the display device 100 may display an image of a high-definition (HD), ultra HD (UHD), or higher level, when the image received from the source device 500 indicates an SD level, the display device 100 may determine that the source device 500 has a problem with parsing the EDID of the display device 100. Therefore, in this case, the display device 100 may modify the EDID thereof to EDID parsable by the source device 500.

According to an embodiment of the disclosure, the controller 190 may detect attribute information from the image received from the source device 500, and determine whether the detected attribute information corresponds to the EDID provided by the display device 100. According to an example, the controller 190 may detect a resolution as the attribute information of the image received from the source device 500, and determine whether the detected resolution corresponds to the EDID provided by the display device 100. For example, when the resolution of the image received from the source device 500 is lower than or equal to an SD level (e.g., 480p or 576p), the controller 190 may determine whether the resolution corresponds to display characteristics information specified in the EDID of the display device 100. Because the SD-level resolution is a preset low-resolution format processable by the source device 500 when the source device 500 fails to parse the EDID of the display device 100, when the SD-level image is received, the display device 100 may regard that the source device 500 has failed to parse the EDID. For example, when the resolution of the received image is an SD level and the EDID of the display device 100 is 3-block or 4-block EDID, the controller 190 may determine that the received image does not correspond to the EDID of the display device 100. For example, when the resolution of the received image is an SD level and the EDID of the display device 100 is 2-block EDID, the controller 190 may determine that the received image corresponds to the EDID of the display device 100.

The transmitter 510 of the source device 500 may be connected to the receiver 110 of the display device 100 through one or more cables. A communication procedure when the transmitter 510 is connected to the receiver 110 through an HDMI cable will now be described with reference to FIG. 5.

Referring to FIG. 5, an HDMI cable 300 may include a transition minimized differential signaling (TMDS) line 310 for transmitting image and audio signals, a display data channel (DDC) line 320 for transmitting EDID, a 5V power line 330 for providing a 5V voltage from the source device 500 to the display device 100, and a hot plug detect (HPD) line 340 for controlling EDID reading.

As operation based on the HDMI cable connection between the source device 500 and the display device 100, initially, when the source device 500 is connected to the display device 100 through the HDMI cable 300, the transmitter 510 of the source device 500 may provide a 5V voltage to the receiver 110 of the display device 100 through the 5V power line 330. The receiver 110 of the display device 100 having received the 5V voltage may transmit a high-level voltage signal to the transmitter 510 of the source device 500 through the HPD line 340. The transmitter 510 of the source device 500 having received the high-level voltage signal through the HPD line 340 may send an EDID request signal through the DDC line 320, and the receiver 110 of the display device 100 having received the EDID request signal may provide EDID of the display device 100 to the transmitter 510 of the source device 500. The controller 530 of the source device 500 having received the EDID of the display device 100 may obtain display characteristics information by parsing the EDID and provide control to process content based on the obtained display characteristics information. The transmitter 510 of the source device 500 may transmit processed image and audio signals to the receiver 110 of the display device 100 through the TMDS line 310.

The source device 500 may determine whether an HPD signal has a high level higher than or equal to a preset certain voltage level, and read the EDID from the display device 100 according to an inter-integrated circuit (I2C) bus protocol when the HPD signal has a high level. Therefore, the display device 100 may control the source device 500 to read the EDID of the display device 100, by controlling the HPD line 340. Specifically, when the EDID is required to be modified, the display device 100 may maintain the HPD line 340 at a low level while the EDID is being modified, thereby preventing the source device 500 from reading the EDID signal, and increase the HPD line 340 to a high level after the EDID is completely modified, thereby controlling the source device 500 to read the modified EDID.

According to an embodiment of the disclosure, the display device 100 modifies the EDID thereof when a resolution of the image received from the source device 500 does not correspond to the EDID and, in this case, the display device 100 may maintain the HPD line 340 at a low level while the EDID is being modified, thereby preventing the source device 500 from reading the EDID signal, and increase the HPD line 340 to a high level after the EDID is completely modified, thereby controlling the source device 500 to read the modified EDID.

According to an embodiment of the disclosure, the display device 100 may restore the modified EDID to the original EDID when a specific event is detected. The restoration of the modified EDID to the original EDID may mean that the modified EDID stored in the EDID memory 180 to be read by the source device 500 is replaced by the original EDID. The specific event may include an event indicating that the connection to the source device 500 is terminated. The specific event may include, for example, detection of disconnection of a cable, reception of a power off input of the display device 100, or entry to a power management system of the display device 100. For example, when the connection to the source device 500 is terminated after the display device 100 modifies the EDID because the resolution of the image received from the source device 500 does not correspond to the EDID of the display device 100, the display device 100 does not need to maintain the EDID modified for the connection to the source device 500, and thus may return the EDID stored in the EDID memory 180, to the original EDID.

Figure 6:
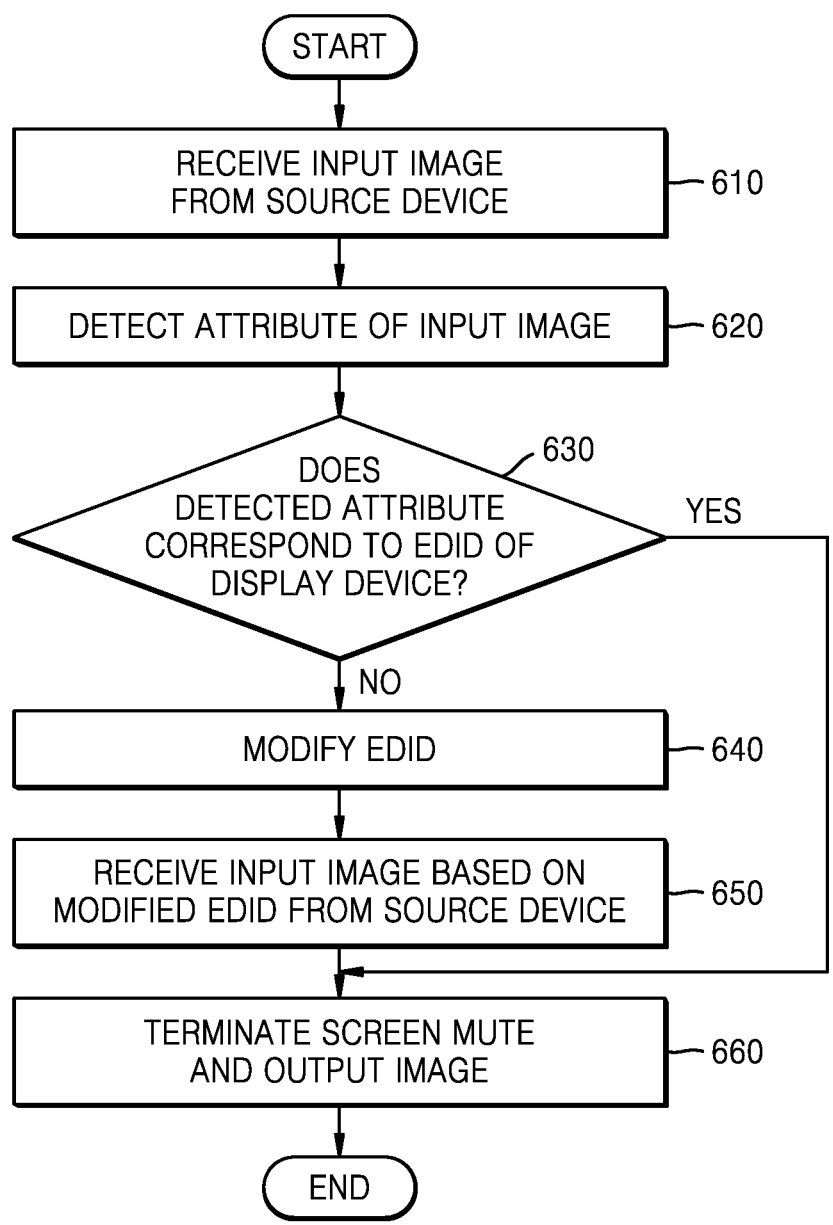
FIG. 6 is an example of a flowchart of an operating method of a display device, according to an embodiment of the disclosure.

FIG. 6 is an example of a flowchart of an operating method of the display device 100, according to an embodiment of the disclosure.

Referring to FIG. 6, in operation 610, the display device 100 may receive an input image from the source device 500. The input image received from the source device 500 by the display device 100 in operation 610 may be an image processed in a format based on display characteristics information included in EDID read from the display device 100 by the source device 500.

In operation 620, the display device 100 may detect an attribute of the received input image. The attribute of the input image which is detected by the display device 100 may include one or more attributes included in the display characteristics information defined in the EDID. For example, the display device 100 may detect resolution information of the input image as the attribute of the input image.

In operation 630, the display device 100 may determine whether the detected attribute corresponds to the EDID of the display device 100. As such, the display device 100 may determine whether the source device 500 has properly parsed the EDID of the display device 100 and provided an image processed in a format based on the display characteristics information defined in the EDID.

According to an embodiment of the disclosure, the display device 100 may determine whether the resolution of the received input image corresponds to a resolution defined in the EDID. For example, the display device 100 may determine whether the received input image corresponds to the EDID of the display device 100, by determining whether the resolution of the received input image corresponds to preferred timing information defined in the EDID.

According to an embodiment of the disclosure, when the resolution of the received input image is lower than or equal to an SD level, e.g., 480p or 576p, and when the EDID of the display device 100 has a 3-or-more-block structure, the display device 100 may determine that the resolution of the received input image does not correspond to the EDID. Although the EDID of the display device 100 having a 3-or-more-block structure represents that the display device 100 provides a resolution much higher than at least the SD level, when the source device 500 has sent the SD-level image, it may indicate that the source device 500 has failed to properly parse the EDID of the display device 100. Therefore, it may be determined that the input image sent from the source device 500 having failed to parse the EDID does not correspond to the EDID provided by the display device 100.

When it is determined in operation 630 that the attribute of the input image received from the source device 500 corresponds to the EDID of the display device 100, the display device 100 may proceed to operation 660. For example, when the resolution of the input image indicates an SD level and when the EDID of the display device 100 has a 2-block structure, the display device 100 may determine that the attribute of the received input image corresponds to the EDID of the display device 100.

In operation 660, the display device 100 may terminate a display screen mute state and control the input image received from the source device 500 to be displayed on the screen. Specifically, when signal synchronization of the input image received from the source device 500 is stabilized to an outputtable state, the display device 100 may terminate the display screen mute state and control the input image to be displayed on the screen.

When it is determined in operation 630 that the attribute of the input image received from the source device 500 does not correspond to the EDID of the display device 100, the display device 100 may proceed to operation 640. For example, when the resolution of the input image indicates an SD level and when the EDID of the display device 100 has a 3-or-more-block structure, the display device 100 may determine that the resolution of the received input image does not correspond to the EDID of the display device 100.

In operation 640, the display device 100 may modify the EDID. That is, when it is determined in operation 630 that the display device 100 has received the input image not corresponding to the EDID thereof from the source device 500, it may indicate that the source device 500 is likely to have failed to properly parse the EDID provided by the display device 100, and thus the display device 100 may modify the EDID to a format parsable by the source device 500 and provide the EDID to the source device 500 again.

According to an embodiment of the disclosure, the display device 100 may modify EDID including a plurality of blocks, to EDID including a preset number of blocks. The plurality of EDID blocks included in the EDID may include one base EDID block and one or more EDID extension blocks, and the display device 100 may modify the EDID to the EDID including the preset number of blocks by leaving the base EDID block and one EDID extension block and removing the other EDID extension blocks.

According to an embodiment of the disclosure, the display device 100 may modify 3-or-more-block EDID to 2-block EDID. For example, the display device 100 may modify 3-or-more-block EDID to 2-block EDID by leaving only a base EDID block and one EDID extension block of the 3-or-more-block EDID and removing the other EDID extension blocks.

According to an embodiment of the disclosure, when the EDID including the plurality of blocks is modified to the EDID including the preset number of blocks, the display device 100 may not modify but equally maintain information of remaining EDID blocks.

According to an embodiment of the disclosure, when the EDID including the plurality of blocks is modified to the EDID including the preset number of blocks, the display device 100 may modify information of remaining EDID blocks. For example, the display device 100 may modify and write preferred timing information included in a base EDID block.

According to an embodiment of the disclosure, the display device 100 may prepare a plurality of pieces of EDID in various combinations and configurations in advance, and select one of the plurality of pieces of EDID and store the selected EDID in the EDID memory 180 to be read by the source device 500, when EDID modification is required.

In operation 650, the display device 100 may receive an input image based on the modified EDID from the source device 500.

Specifically, the display device 100 may control the source device 500 to read the modified EDID after the EDID is completely modified, and receive, from the source device 500, an image processed in a format based on the modified EDID.

In operation 660, when synchronization of the image received from the source device 500 and processed in the format based on the modified EDID is stabilized, the display device 100 may terminate a screen mute state and control the received image to be output. When it is determined as described above that the image received from the source device 500 does not correspond to the EDID of the display device 100, the display device 100 may modify the EDID to be parsable by the source device 500 and provide the EDID to the source device 500 again, thereby receiving a high-quality image from the source device 500 and outputting the image. Because the above operation for enhancing EDID compatibility is automatically performed in the display device 100 without involvement of a user, a service may be provided without causing inconvenience of manipulation to the user. Although the modified EDID is provided once again between the source device 500 and the display device 100 and thus a little more time may be taken until the display device 100 receives the image of the format based on the final modified EDID, because the additional time is not long to burden the user, manual manipulation of the user may not be required and a problem caused by EDID compatibility may be solved.

Figure 7:
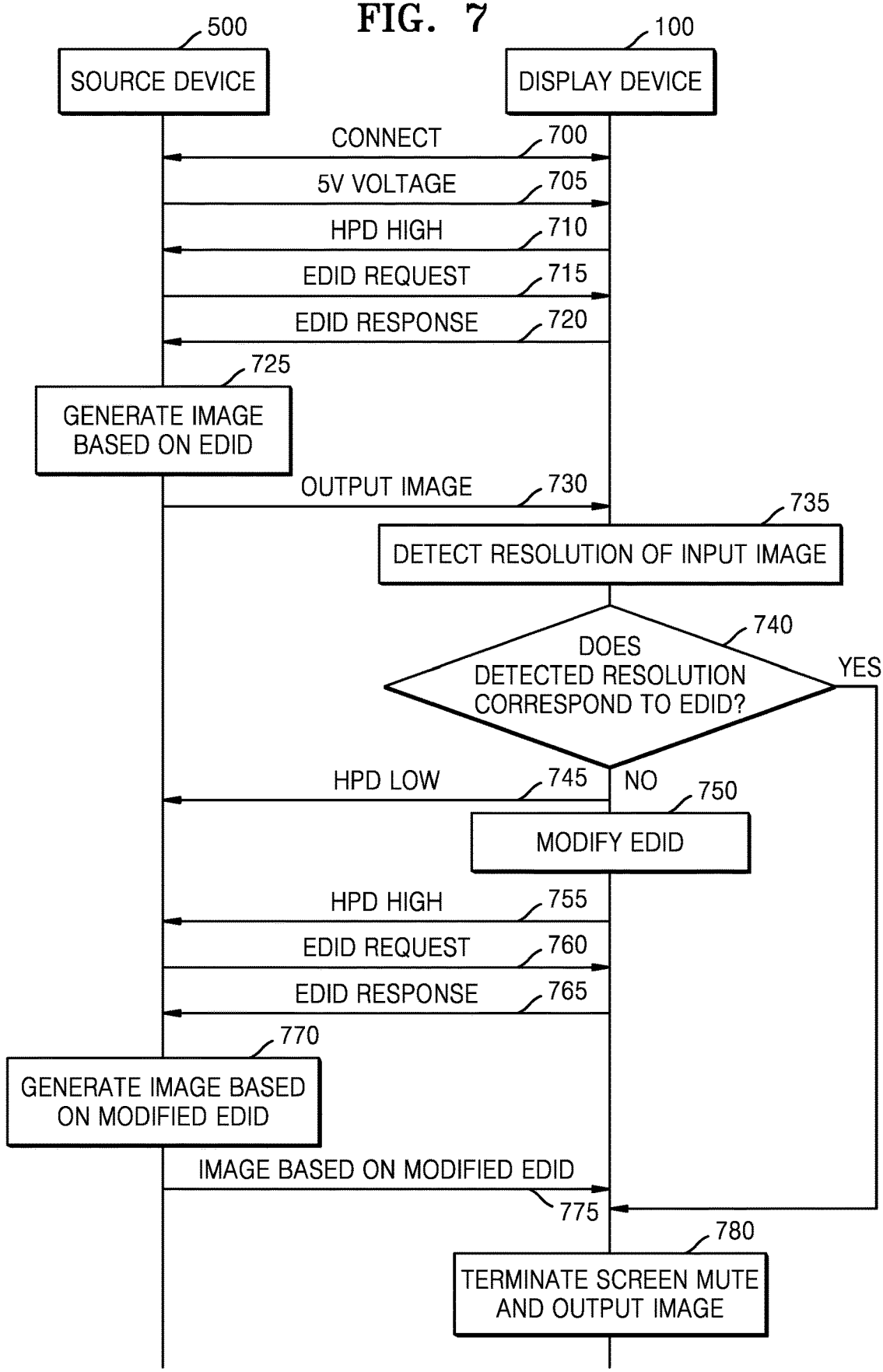
FIG. 7 is a flowchart for describing specific operations of a display device connected to a source device through a high-definition multimedia interface (HDMI) cable, according to an embodiment of the disclosure.

FIG. 7 is a flowchart for describing specific operations of the display device 100 connected to the source device 500 through an HDMI cable, according to an embodiment of the disclosure.

Referring to FIG. 7, in operation 700, the source device 500 may be connected to the display device 100 through the HDMI cable. Specifically, the transmitter 510 of the source device 500 may be connected to the receiver 110 of the display device 100 through the HDMI cable.

In operation 705, when the source device 500 is connected to the display device 100 through the HDMI cable, the source device 500 may send a 5V voltage to the display device 100 through the 5V power line 330.

In operation 710, the display device 100 having received the 5V voltage from the source device 500 through the 5V power line 330 may transmit a high-level signal through the HPD line 340. In the high-level state of the HPD line 340, the source device 500 may read EDID from the display device 100.

In operation 715, the source device 500 having received the high-level signal of the HPD line 340 may transmit an EDID request signal to the display device 100 through the DDC line 320.

In operation 720, the display device 100 having received the EDID request signal may transmit, to the source device 500 through the DDC line 320, an EDID response signal including the EDID of the display device 100. Specifically, when the EDID request is received from the source device 500, the display device 100 may transmit, to the source device 500, the EDID response including EDID stored in the EDID memory 180.

In operation 725, the source device 500 having received the EDID from the display device 100 may generate an image of a format based on display characteristics information defined in the received EDID. Specifically, the source device 500 may obtain the display characteristics information defined in the EDID, by parsing the EDID received from the display device 100. The source device 500 may process and generate an image in a format displayable by the display device 100, based on the obtained display characteristics information.

The EDID has an expandable structure and thus may include two or more EDID blocks. Depending on parsing performance of the source device 500, the source device 500 may fail to parse the EDID received from the display device 100. For example, the EDID may include three blocks and the source device 500 may parse 2-block EDID but may not parse 3-or-more-block EDID. For example, the source device 500 may not parse a DisplayID block or a Map block other than a base EDID block such as a VESA block or a CEA block. For example, the source device 500 may not parse the first byte information of each extension block. For various reasons as described above, the source device 500 may fail to parse 3-or-more-block EDID. When EDID parsing fails as described above, the source device 500 may process an image in a low-resolution format preset by default, or generate a DVI signal having no audio signal. The low-resolution format used to process the image when the source device 500 fails to parse the EDID may be 480p or 576p.

As described above, in operation 725, when the source device 500 succeeds in parsing the EDID, the source device 500 may generate an image of a format based on the display characteristics information defined in the EDID. When the source device 500 fails to parse the EDID, the source device 500 may process an image in a preset low-resolution format, i.e., an SD-level format, or generate a DVI signal having no audio signal.

In operation 730, the source device 500 may transmit the generated image to the display device 100 through the TMDS line 310. When the source device 500 has succeeded in parsing the EDID of the display device 100, the display device 100 would receive an image of a format corresponding to the EDID thereof and, when the source device 500 has failed to parse the EDID of the display device 100, the display device 100 would receive a low-resolution image other than an image of a format corresponding to the EDID thereof.

In operation 735, the display device 100 may detect a resolution of the input image received from the source device 500. The display device 100 may detect the resolution information of the input image based on HDMI state information transmitted together with the input image received from the source device 500. The HDMI state information may include a video format field indicating a current video format used by an HDMI port, and the video format field may include information such as the number of vertical lines, the number of horizontal lines, a scan rate, and a screen aspect ratio related to a video format on an HDMI link. The display device 100 may detect the resolution of the input image based on the information of the video format field.

In operation 740, the display device 100 may determine whether the detected resolution corresponds to the EDID.

According to an embodiment of the disclosure, the display device 100 may determine whether the detected resolution corresponds to a resolution defined in the EDID. That is, when the detected resolution has a value corresponding to the resolution defined in the EDID, the display device 100 may determine that the detected resolution corresponds to the EDID. However, when the detected resolution does not have a value corresponding to the resolution defined in the EDID, the display device 100 may determine that the detected resolution does not correspond to the EDID. For example, when the detected resolution is a low resolution, i.e., 480p or 576p, and when the EDID has a 3-or-more-block structure, the display device 100 may determine that the detected resolution does not correspond to the EDID. For example, although the detected resolution is a low resolution, i.e., 480p or 576p, when the EDID has a 2-block structure, the display device 100 may determine that the detected resolution corresponds to the EDID, and determine that the input image is to be output as it is.

When it is determined that the detected resolution corresponds to the resolution defined in the EDID, the display device 100 proceeds to operation 780 and, in operation 780, the display device 100 may terminate a display screen mute state and output the input image. For example, when the detected resolution of the input image is a low resolution and when the EDID of the display device 100 has a 2-block structure, it may not be regarded that the source device 500 had a problem with EDID parsing, and thus the display device 100 may output the received input image as it is. For example, although the original EDID of the display device 100 has a 3-or-more-block structure, the display device 100 may intentionally modify the EDID to 2-block EDID in a specific situation. For example, when an image to be output on a picture in picture (PIP) screen is received from the source device 500, the PIP screen has a relatively small size and thus a low-resolution image may be sufficient to be output. In this case, the display device 100 may intentionally modify the 3-or-more-block EDID thereof to a 2-block structure and store the modified EDID in the EDID memory 180. At this time, even when the display device 100 receives a low-resolution image from the source device 500, because the EDID stored in the EDID memory 180 thereof has a 2-block structure and thus the received image corresponds to the EDID, the display device 100 may determine that the received image is to be output as it is.

When it is determined that the detected resolution does not correspond to the resolution defined in the EDID, the display device 100 may proceed to operation 745.

In operation 745, the display device 100 may transmit a high-level signal through the HPD line 340. The display device 100 may control the source device 500 to read the EDID, by using a state signal transmitted through the HPD line 340. When the 5V voltage is initially received from the source device 500, the display device 100 may transmit a high-level signal through the HPD line 340. Thereafter, during operation of the display device 100, the display device 100 may transmit a high-level signal through the HPD line 340 to control the EDID to be read, or transmit a low-level signal through the HPD line 340 to control the EDID not to be read. The display device 100 may transmit a low-level signal through the HPD line 340 to control the source device 500 not to read the EDID while the EDID is being modified in operation 750.

In operation 750, the display device 100 may modify the EDID. According to an embodiment of the disclosure, when the detected resolution is a low resolution, i.e., 480p or 576p, and when the EDID has a 3-or-more-block structure, the display device 100 may modify the 3-or-more-block EDID to 2-block EDID. The EDID modification operation will be described in detail below with reference to FIGS. 8 to 18.

In operation 755, when the operation of modifying the EDID and writing the modified EDID in the EDID memory 180 is completed, to control the source device 500 to reread the modified EDID written in the EDID memory 180, the display device 100 may transmit a high-level signal to the source device 500 through the HPD line 340.

In operation 760, the source device 500 having received the high-level signal of the HPD line 340 may transmit an EDID request signal to the display device 100 through the DDC line 320.

In operation 765, the display device 100 having received the EDID request signal may transmit, to the source device 500 through the DDC line 320, an EDID response signal including the modified EDID stored in the EDID memory 180.

In operation 770, the source device 500 having received the EDID response signal including the modified EDID may parse the modified EDID, and generate an image based on the modified EDID by processing the image in a format based on display characteristics information included in the parsed EDID.

In operation 775, the source device 500 may transmit the image based on the modified EDID to the display device 100 through the TMDS line 310.

In operation 780, the display device 100 may receive the image based on the modified EDID, and terminate a display screen mute state and output the image when signal synchronization is stabilized.

The image based on the modified EDID may still be a low-resolution image, e.g., 480p. However, at this time, because the display device 100 has already stored the 2-block EDID in the EDID memory 180, when it is recognized that the EDID stored in the EDID memory 180 has a 2-block structure, the display device 100 may determine that the received image corresponds to the EDID. Therefore, in such a case, the screen mute state may be terminated and the image may be output immediately after the signal is stabilized.

Figure 8:
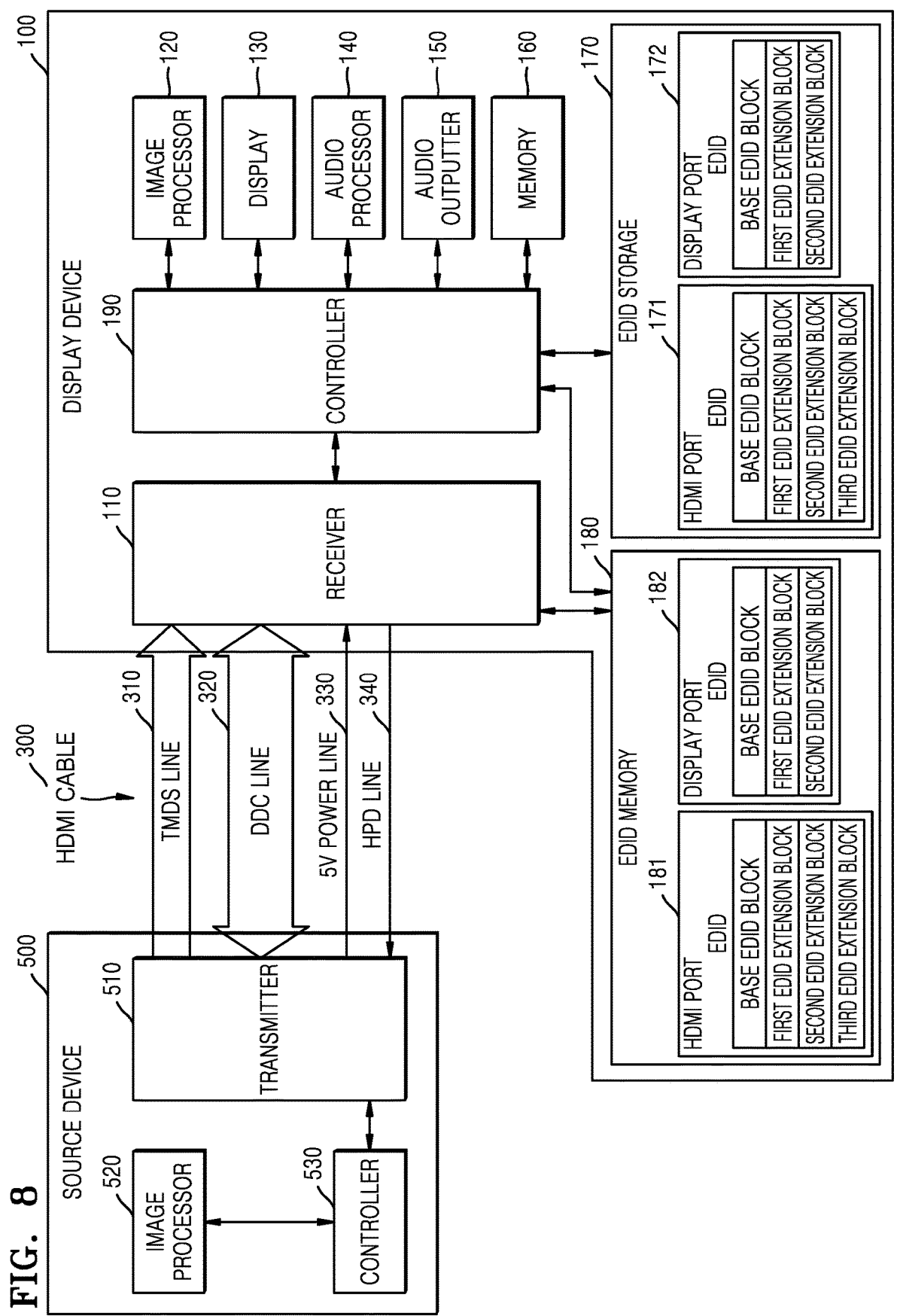
FIG. 8 shows an example of a structure of EDID stored in a display device, according to an embodiment of the disclosure.

FIG. 8 shows an example of a structure of EDID stored in the display device 100, according to an embodiment of the disclosure.

Referring to FIG. 8, according to an example, the display device 100 may include an HDMI port and a DisplayPort port in the receiver 110. The EDID storage 170 may store EDID 171 corresponding to the HDMI port, and EDID 172 corresponding to the DisplayPort port. The EDID 171 corresponding to the HDMI port may include a base EDID block, a first EDID extension block, a second EDID extension block, and a third EDID extension block. The EDID 172 corresponding to the DisplayPort port may include a base EDID block, a first EDID extension block, and a second EDID extension block. The EDID stored in the EDID storage 170 may be stored when the display device 100 is produced.

When the display device 100 is sold and operated, the controller 190 may write the EDID stored in the EDID storage 170, in the EDID memory 180. Basically, in a normal operation state, the controller 190 may write the EDID stored in the EDID storage 170, i.e., EDID indicating a state in which the display device 100 may optimally display content, equally in the EDID memory 180, thereby controlling the source device 500 to read the EDID including optimal display characteristics information. Therefore, in FIG. 8, the EDID stored in the EDID storage 170 may be written equally in the EDID memory 180, and thus the EDID written in the EDID memory 180 may include EDID 181 corresponding to the HDMI port, and EDID 182 corresponding to the DisplayPort port.

When requested by the source device 500, the receiver 110 may transmit, to the source device 500 under the control by the controller 190, a response including the EDID stored in the EDID memory 180.

Figure 9:
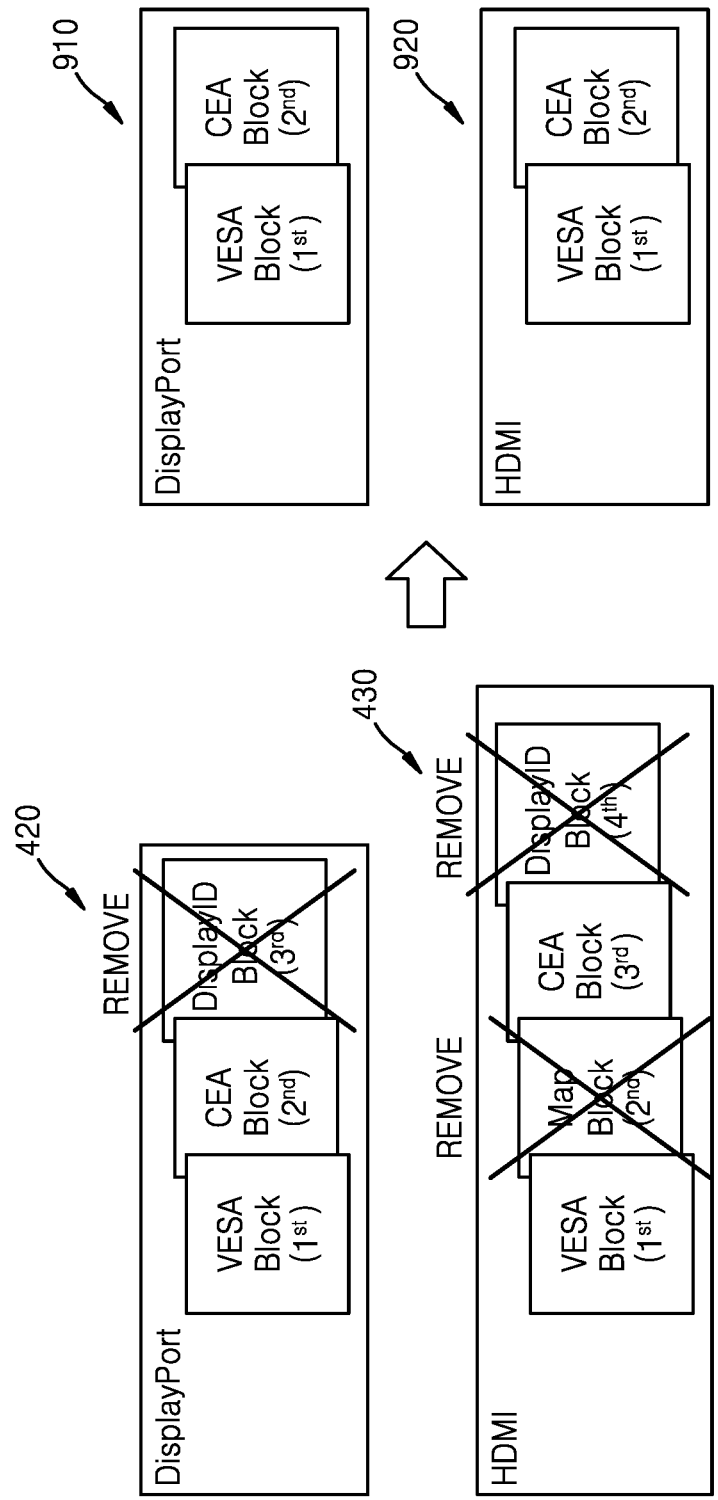
FIG. 9 is a reference view for describing an example of modifying 3-or-more-block EDID to 2-block EDID, according to an embodiment of the disclosure.

FIG. 9 is a reference view for describing an example of modifying 3-or-more-block EDID to 2-block EDID, according to an embodiment of the disclosure.

Referring to FIG. 9, the display device 100 may generate 2-block EDID 910 including a VESA block and a CEA block, by removing a DisplayID block from the 3-block EDID 420 corresponding to a DisplayPort port using EDID version 1.4. The display device 100 may generate 2-block EDID 920 including a VESA block and a CEA block, by removing a Map block and a DisplayID block from the 4-block EDID 430 corresponding to an HDMI port using EDID version 1.3. By modifying the EDID to a 2-block structure as described above, the EDID may be parsed by the source device 500.

Figure 10:
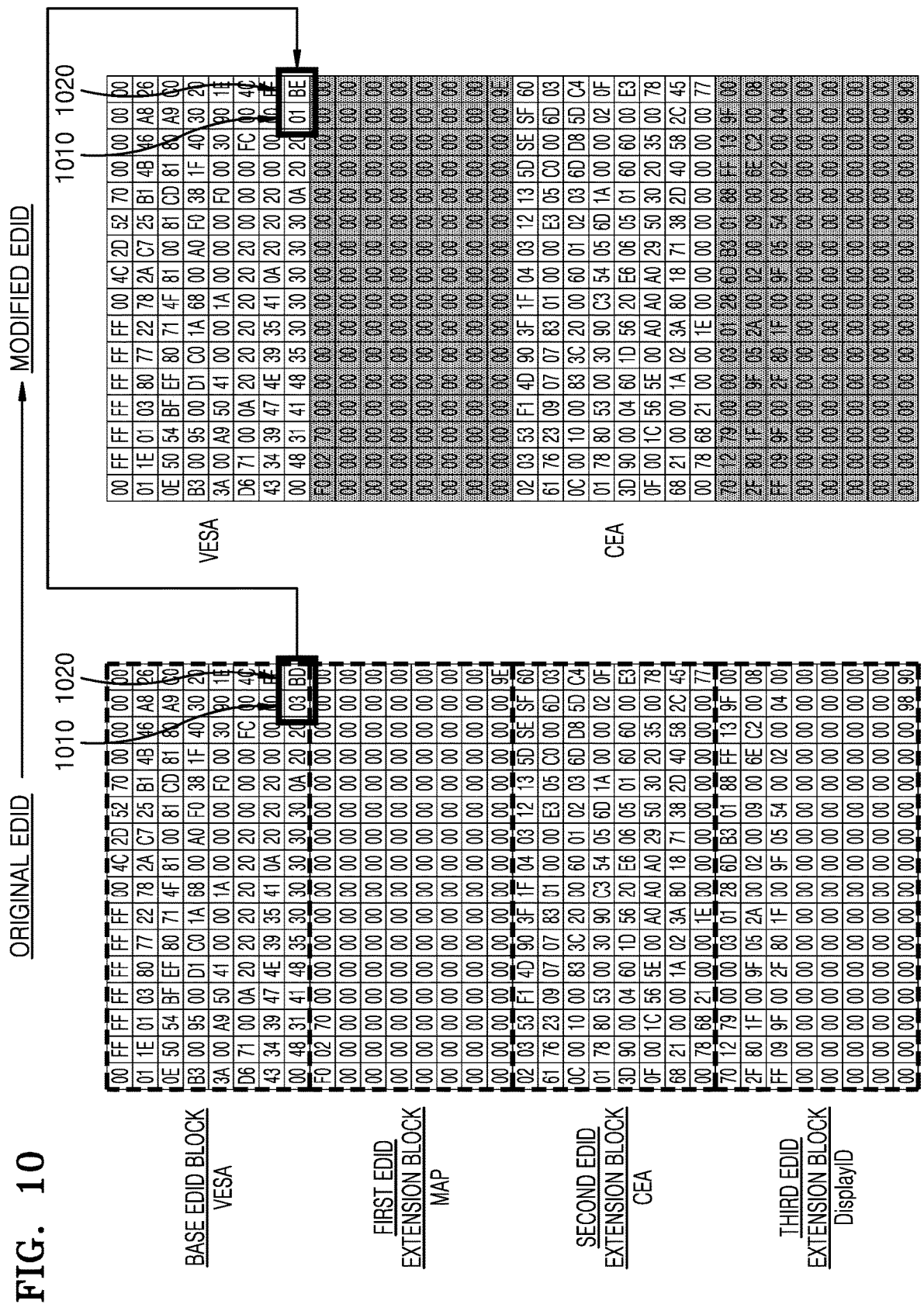
FIG. 10 is a view for describing an example of modifying 4-block EDID corresponding to an HDMI port using EDID version 1.3, to 2-block EDID, according to an embodiment of the disclosure.

FIG. 10 is a view for describing an example of modifying 4-block EDID corresponding to an HDMI port using EDID version 1.3, to 2-block EDID, according to an embodiment of the disclosure.

Referring to FIG. 10, according to an embodiment of the disclosure, the display device 100 may generate 2-block EDID by removing a first EDID extension block (e.g., a MAP block) and a third extension EDID block (e.g., a DisplayID block) from and leaving a base EDID block (e.g., a VESA block) and a second EDID extension block (e.g., a CEA block) in 4-block EDID corresponding to an HDMI port using EDID version 1.3.

In this case, one of the last two bytes of the VESA block indicates an extension flag 1010, and the other indicates a checksum 1020.

The extension flag 1010 indicates the number of extension blocks included in the EDID, and the extension flag 1010 of the VESA block exhibits a value of 03 before the EDID is modified because three extension blocks, i.e., the Map block, the CEA block, and the DisplayID block, are present, but exhibits a value of 01 after the EDID is modified because one extension block is left by removing two extension blocks, i.e., the Map block and the DisplayID block, from the EDID.

The checksum 1020 may be modified by reflecting the value of the extension flag 1010 modified from 03 to 01.

Figure 11:
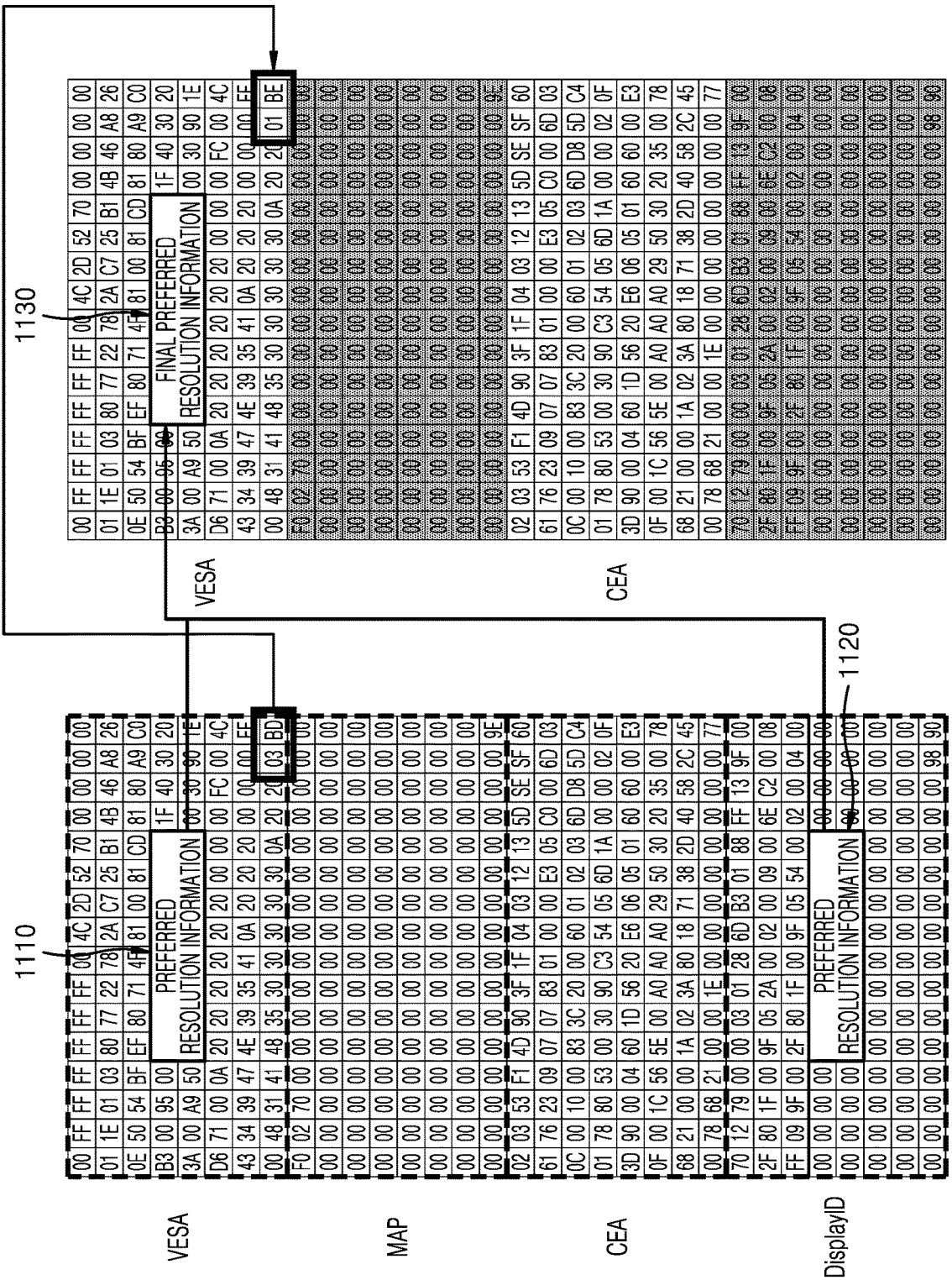
FIG. 11 is a view for describing another example of modifying 4-block EDID corresponding to an HDMI port using EDID version 1.3, to 2-block EDID, according to an embodiment of the disclosure.

FIG. 11 is a view for describing another example of modifying 4-block EDID corresponding to an HDMI port using EDID version 1.3, to 2-block EDID, according to an embodiment of the disclosure.

Although 2-block EDID is generated by merely removing two extension blocks from 4-block EDID in the example of FIG. 10, 4-block EDID may be modified to 2-block EDID and information of the VESA block may be further modified in the example of FIG. 11.

To modify the EDID by removing a DisplayID block, the display device 100 may modify an existing VESA block. Specifically, the display device 100 may determine final preferred resolution information 1130 considering preferred resolution information 1110 written in the VESA block and preferred resolution information 1120 written in the DisplayID block to be removed, and modify the VESA block by writing the determined final preferred resolution information 1130 in the VESA block.

Figure 12:
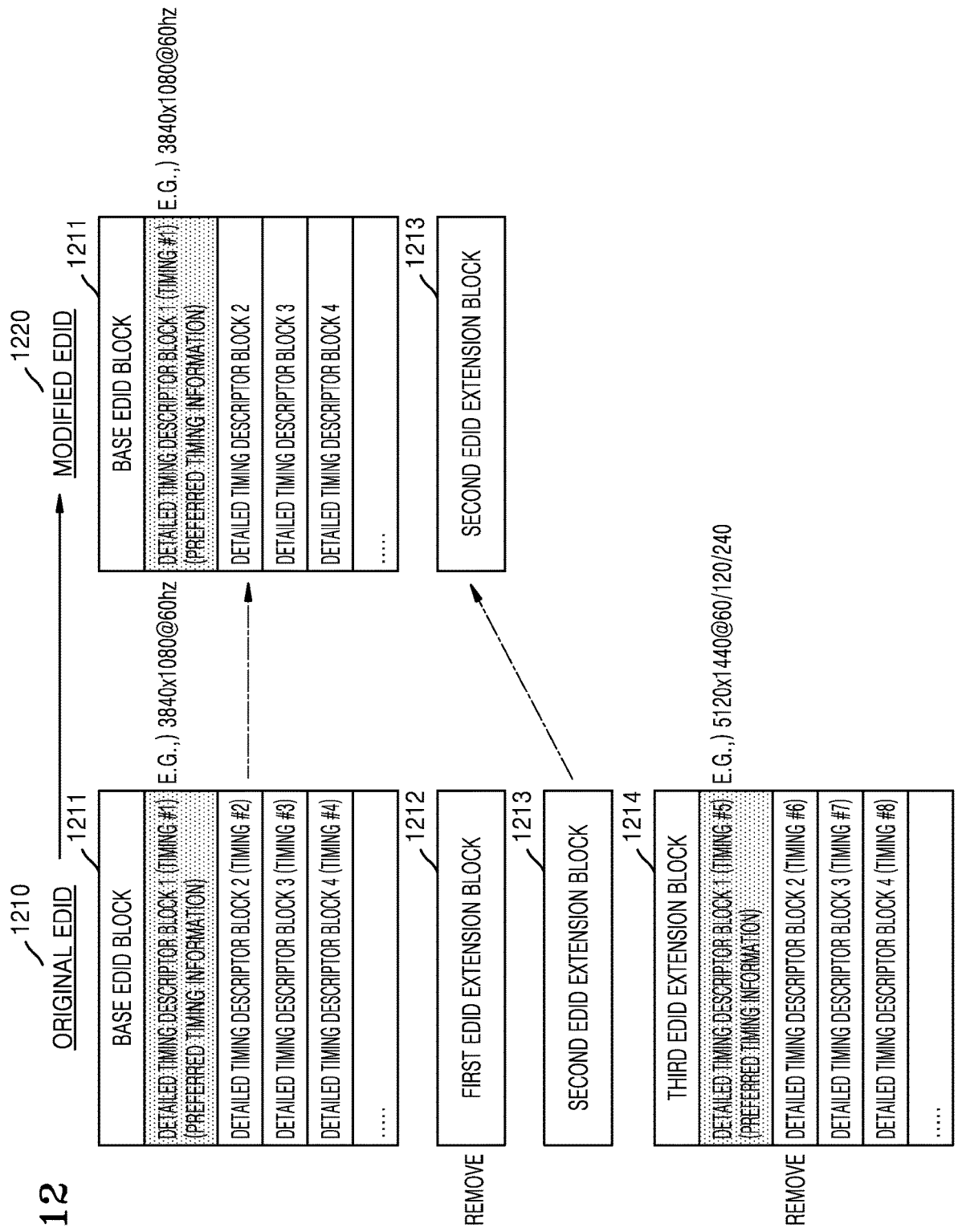
FIG. 12 is a view for describing an example of a specific method of modifying original EDID to modified EDID, according to an embodiment of the disclosure.

FIG. 12 is a view for describing an example of a specific method of modifying original EDID to modified EDID, according to an embodiment of the disclosure.

Referring to FIG. 12, original EDID 1210 may include a base EDID block 1211, a first EDID extension block 1212, a second EDID extension block 1213, and a third EDID extension block 1214. The base EDID block 1211 may include detailed timing descriptor block 1 defining timing #1, detailed timing descriptor block 2 defining timing #2, detailed timing descriptor block 3 defining timing #3, and detailed timing descriptor block 4 defining timing #4. The third EDID extension block 1214 may include detailed timing descriptor block 1 defining timing #5, detailed timing descriptor block 2 defining timing #6, detailed timing descriptor block 3 defining timing #7, and detailed timing descriptor block 4 defining timing #8.

According to an embodiment of the disclosure, the display device 100 may remove the first and third EDID extension block 1212 and 1214, and generate modified EDID 1220 based on the base EDID block 1211 and the second EDID extension block 1213. In this case, the display device 100 may not modify but equally use information of the base EDID block 1211 and the second EDID extension block 1213 included in the original EDID 1210, for the base EDID block 1211 and the second EDID extension block 1213 included in the modified EDID 1220.

For example, when the display device 100 supports a 32:9 monitor, preferred timing information of the base EDID block 1211 of the original EDID 1210 may include 3840× 1080@60 hz. The above information may indicate a resolution within a range writable in a VESA block from among 32:9 resolutions. Preferred timing information of the third EDID extension block 1214 may include 5120×1440@60 hz, 5120×1440@120 hz, or 5120×1440@240 hz. The above information indicates an optimal resolution by reflecting a resolution of a panel supporting the 32:9 format. In the above example, when the display device 100 generates the modified EDID 1220 without modifying but by equally using the information of the base EDID block 1211, the base EDID block 1211 of the modified EDID 1220 may equally include the preferred resolution information of 3840× 1080@60 hz. When the 4-block original EDID 1210 is modified to the 2-block modified EDID 1220 as described above, the source device 500 may succeed in parsing the 2-block modified EDID 1220 and thus generate an image of an appropriate format based on the parsed information. For example, when the source device 500 is an AV device supporting a 16:9 format, although the preferred resolution information included in the modified EDID 1220 parsed by the source device 500 indicates 32:9, the source device 500 may support 16:9 and thus process an image of the 16:9 format and provide the image to the display device 100. In this case, although an image of the 32:9 format supported by the display device 100 may not be received, the display device 100 may still receive a higher-quality image compared to an SD-level low-resolution image previously received when the source device 500 has failed to parse the original EDID 1210.

The second EDID extension block 1213 may also include one or more pieces of timing information. Because the modified EDID 1220 is parsable by the source device 500, the source device 500 may process an image in a format not only based on the preferred timing information included in the base EDID block 1211 but also based on the one or more pieces of timing information included in the second EDID extension block 1213.

Figure 13:
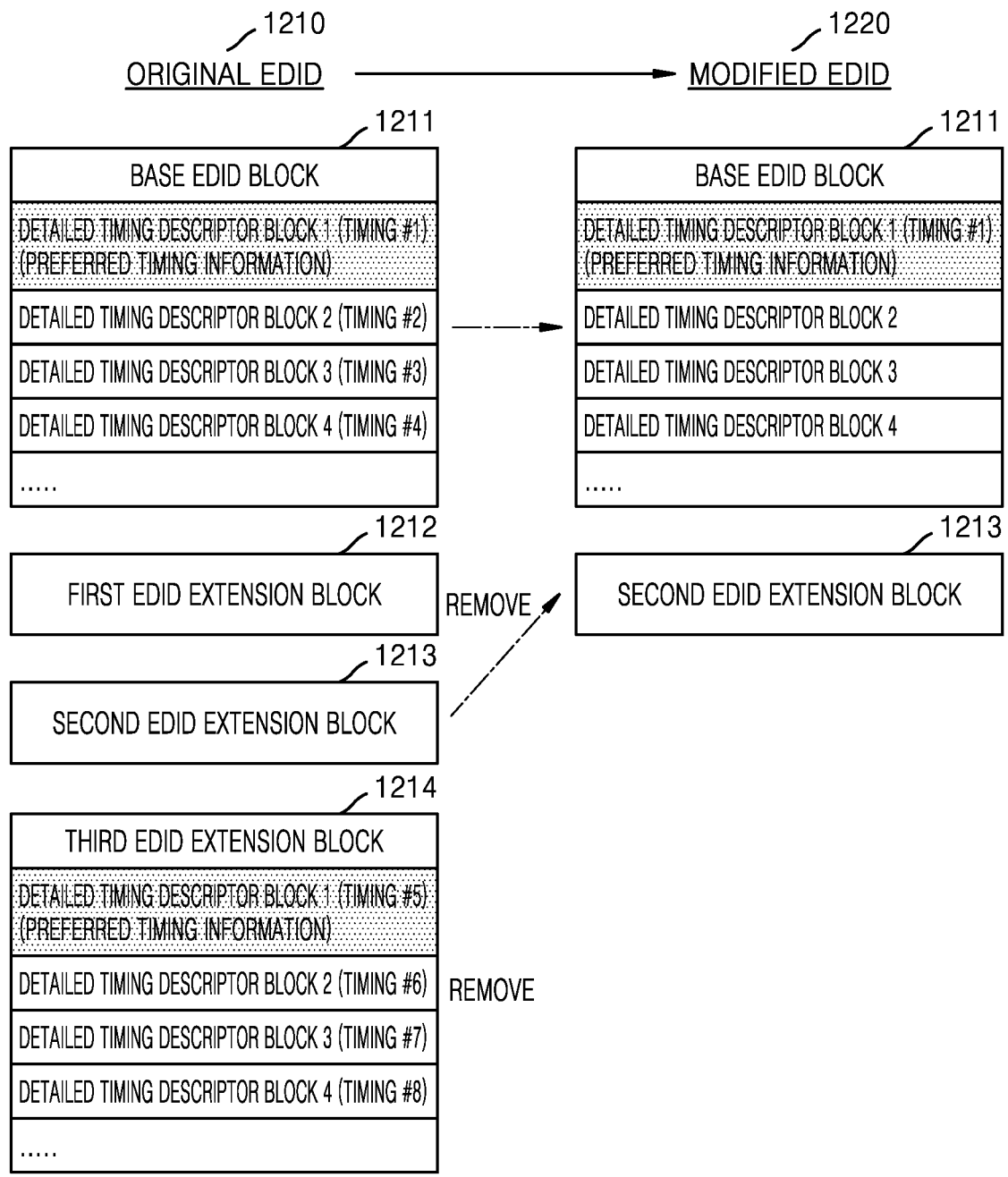
FIG. 13 is a view for describing another example of a method of modifying original EDID to modified EDID, according to an embodiment of the disclosure.

FIG. 13 is a view for describing another example of a method of modifying original EDID to modified EDID, according to an embodiment of the disclosure.

Referring to FIG. 13, according to an embodiment of the disclosure, the display device 100 may remove the first and third EDID extension block 1212 and 1214, and generate the modified EDID 1220 based on the base EDID block 1211 and the second EDID extension block 1213. In this case, the display device 100 may modify information of at least one of the base EDID block 1211 or the second EDID extension block 1213 included in the original EDID 1210, for the base EDID block 1211 and the second EDID extension block 1213 included in the modified EDID 1220.

According to an embodiment of the disclosure, the display device 100 may modify preferred timing information of the base EDID block 1211 included in the modified EDID 1220. For example, the display device 100 may modify the preferred timing information of the base EDID block 1211 considering that the source device 500 is a version of device which may not parse the original EDID 1210. For example, assuming that the source device 500 is an AV device which may not parse the previously sent original EDID 1210, the display device 100 may modify the preferred timing information of the base EDID block 1211 based on resolution information of a format supported by the AV device.

According to an embodiment of the disclosure, the display device 100 may modify one or more pieces of timing information included in the second EDID extension block 1213 included in the modified EDID 1220. For example, the display device 100 may modify the one or more pieces of timing information of the second EDID extension block 1213 considering that the source device 500 is a version of device which may not parse the original EDID 1210. For example, assuming that the source device 500 is an AV device which may not parse the previously sent original EDID 1210, the display device 100 may modify the one or more pieces of timing information of the second EDID extension block 1213 based on resolution information of a format supported by the AV device.

Figure 14:
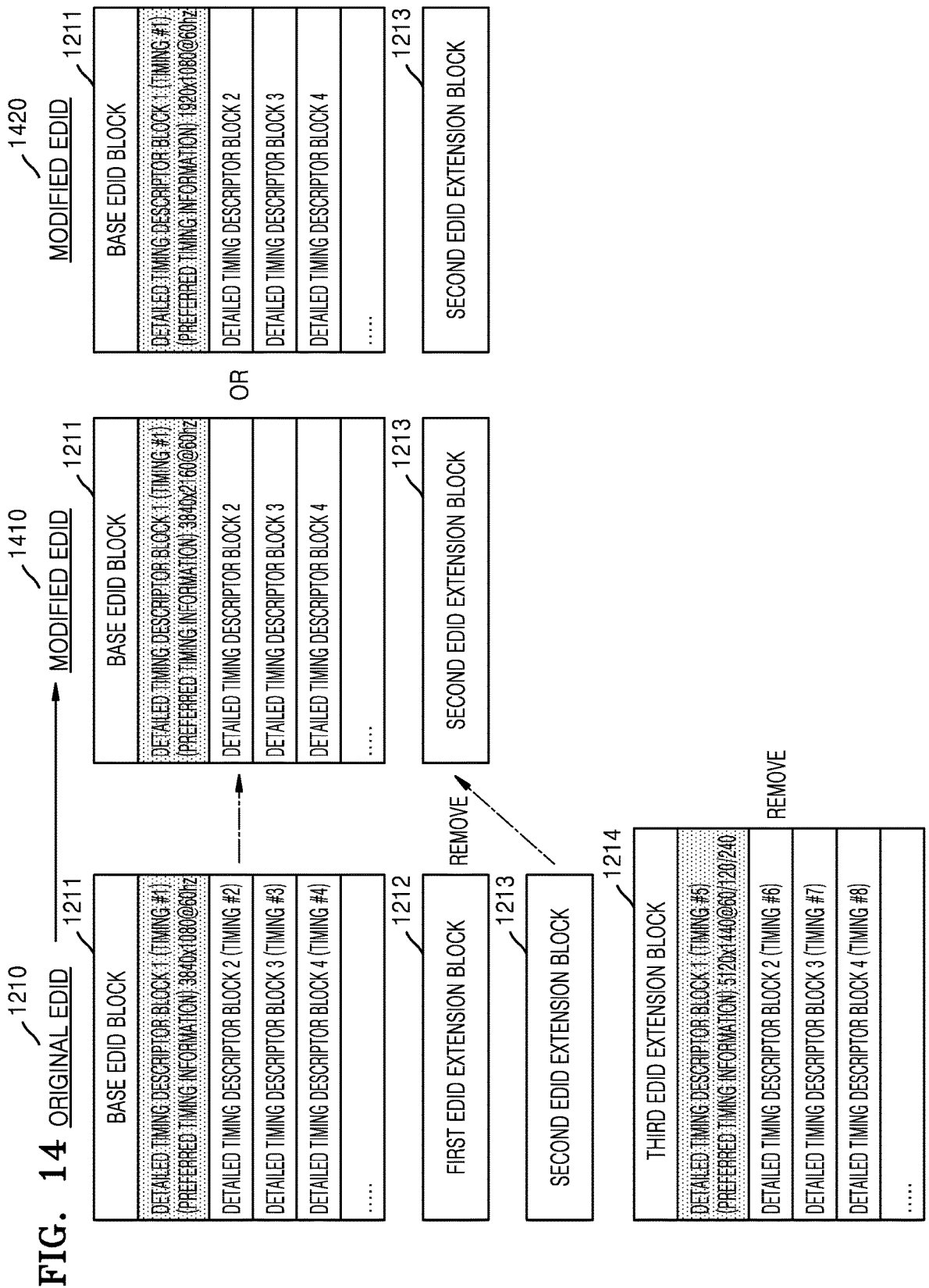
FIG. 14 is a view for describing a specific example of a method of modifying original EDID to modified EDID, according to an embodiment of the disclosure.

FIG. 14 is a view for describing a specific example of a method of modifying original EDID to modified EDID, according to an embodiment of the disclosure.

Referring to FIG. 14, when the display device 100 supports a 32:9 monitor, preferred resolution information of the base EDID block 1211 of the original EDID 1210 may include 3840×1080@60 hz, and preferred timing information of the third EDID extension block 1214 may include 5120×1440@60/120/240 hz.

When the source device 500 may not parse the original EDID 1210 and send a low-resolution image to the display device 100, the display device 100 may determine that the source device 500 is an AV device supporting a 16:9 format. To be parsable by the AV device supporting the 16:9 format, the display device 100 may modify the 4-block original EDID 1210 to 2-block EDID, and also modify the preferred resolution information included in the base EDID block 1211 to timing information corresponding to the 16:9 format. By modifying the preferred resolution information to the timing information corresponding to the 16:9 format as described above, the source device 500 may obtain, from the modified EDID, timing information more appropriate for the format of the source device 500.

According to an embodiment of the disclosure, the display device 100 may modify the preferred timing information of the base EDID block 1211 to be included in the modified EDID, to resolution information corresponding to the 16:9 format. For example, the display device 100 may modify the preferred timing information to a UHD resolution (e.g., 3840×2160@hz) or a full HD (FHD) resolution (e.g., 1920×1080@60 hz) conforming to the 16:9 format. Referring to FIG. 14, modified EDID 1410 is generated by modifying the preferred timing information of the base EDID block 1211 to the UHD resolution (e.g., 3840× 2160@hz), and modified EDID 1420 is generated by modifying the preferred timing information of the base EDID block 1211 to the FHD resolution (e.g., 1920×1080@60 hz).

According to an embodiment of the disclosure, the display device 100 may select the UHD resolution (e.g., 3840×2160@hz) or the FHD resolution (e.g., 1920× 1080@60 hz) to modify the preferred timing information of the base EDID block 1211 to be included in the modified EDID, to the resolution information corresponding to the 16:9 format. However, when the display device 100 has no problem with downscaling, the display device 100 may select the UHD resolution (e.g., 3840×2160@hz) rather than the FHD resolution (e.g., 1920×1080@60 hz) to modify the preferred timing information of the base EDID block 1211 to be included in the modified EDID, to the resolution information corresponding to the 16:9 format. This is because, in general, when the display device 100 receives an image from the source device 500, a higher-quality image may be obtained by receiving a high-resolution image rather than a low-resolution image, and performing downscaling when necessary.

The display device 100 may write the EDID modified as described above, in a memory to be accessed and read by the source device 500. The display device 100 may modify and use EDID whenever an event for EDID modification occurs, or may store original EDID and modified EDID together and select and use the stored modified EDID when the modified EDID is required.

Figure 15:
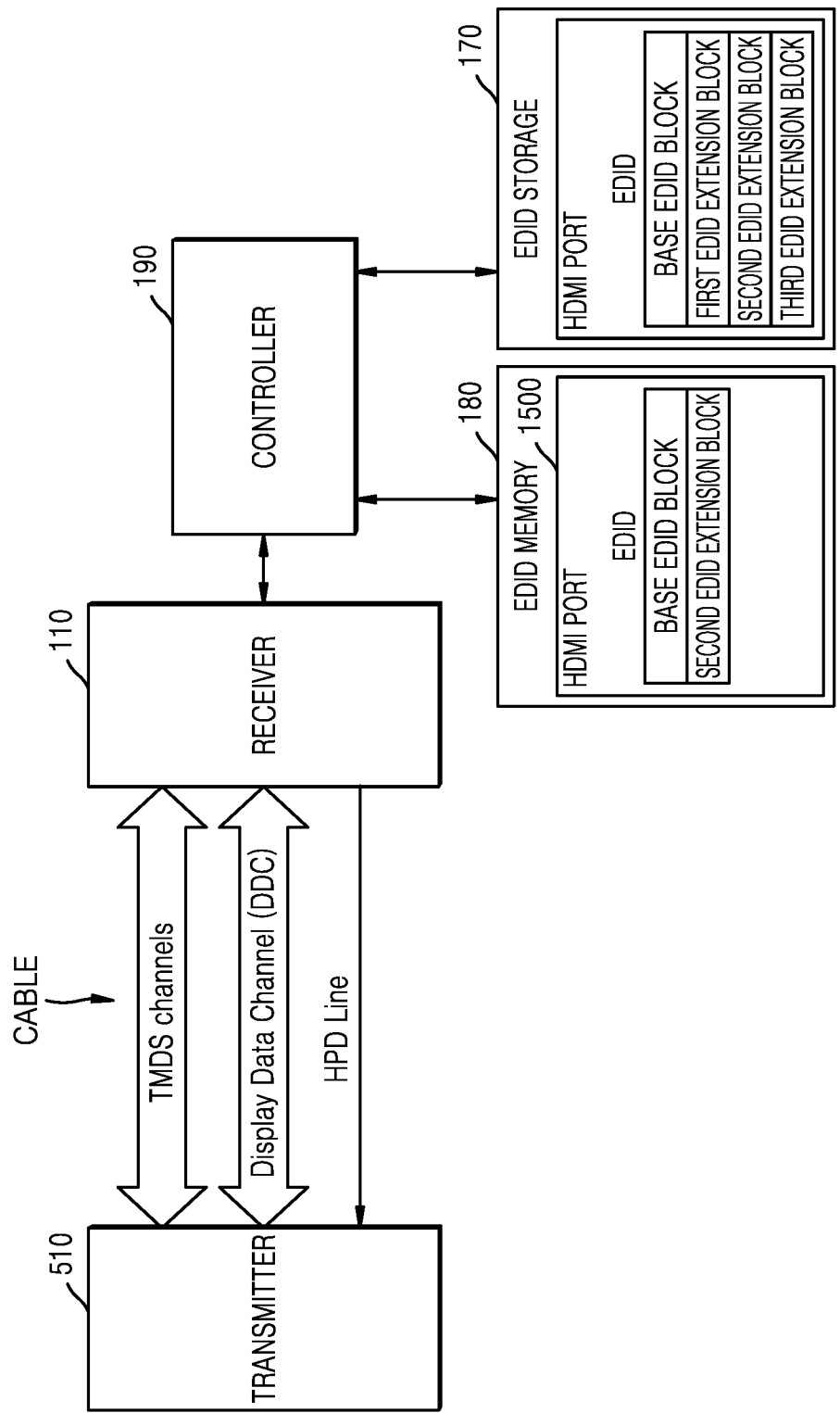
FIG. 15 shows an example of a method of generating and writing modified EDID, according to an embodiment of the disclosure.

FIG. 15 shows an example of a method of generating and writing modified EDID, according to an embodiment of the disclosure.

Referring to FIG. 15, the controller 190 may generate modified EDID 1500 by reading EDID stored in the EDID storage 170, i.e., original EDID, and modifying the EDID according to the above-described method, and store the modified EDID 1500 in the EDID memory 180 to be accessed and read by the source device 500.

Figure 16:
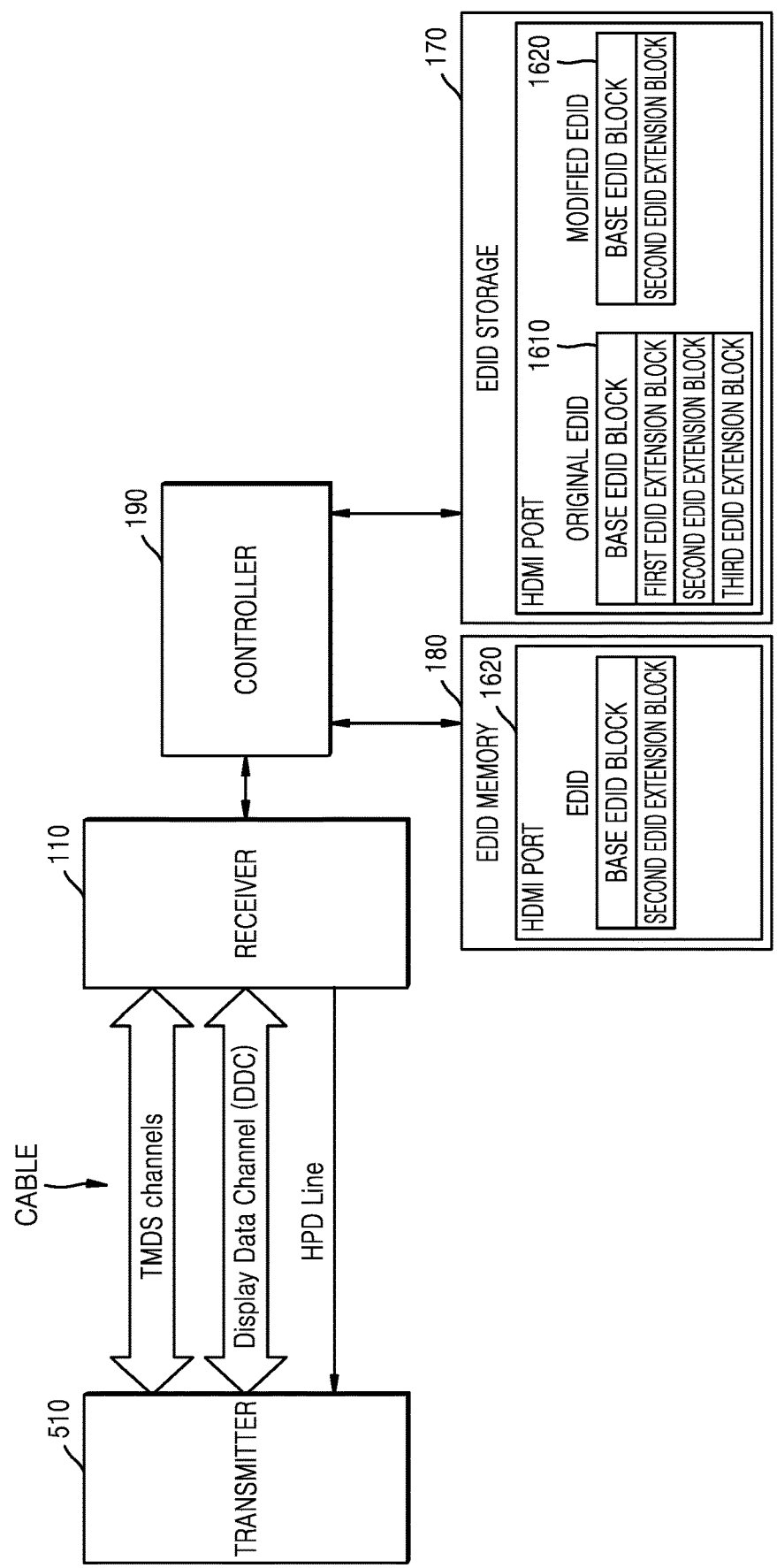
FIG. 16 shows another example of a method of generating and writing modified EDID, according to an embodiment of the disclosure.

FIG. 16 shows another example of a method of generating and writing modified EDID, according to an embodiment of the disclosure.

Referring to FIG. 16, the display device 100 may store a plurality of pieces of EDID in the EDID storage 170. When EDID modification is required, the display device 100 may select appropriate EDID from among the plurality of pieces of EDID stored in the EDID storage 170, and store the selected EDID in the EDID memory 180. For example, the display device 100 may store, in the EDID storage 170, both of 4-block original EDID 1610 and 2-block modified EDID 1620 corresponding to an HDMI port.

Although the display device 100 initially stores the 4-block EDID 1610 in the EDID memory 180, when a low-resolution image is received from the source device 500 and thus the number of EDID blocks needs to be changed to two later, the controller 190 may select the 2-block EDID 1620 in the EDID storage 170, and write the selected modified EDID 1620 in the EDID memory 180.

Figure 17:
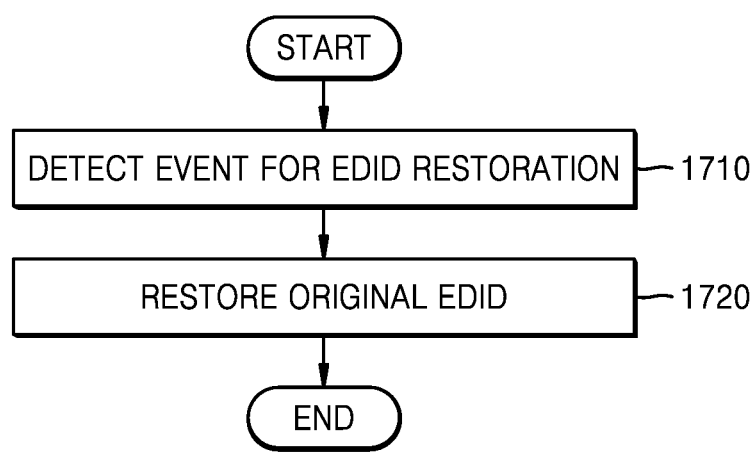
FIG. 17 is a flowchart of an example of a method for an electronic device to restore modified EDID to original EDID, according to an embodiment of the disclosure.

FIG. 17 is a flowchart of an example of a method for the display device 100 to restore modified EDID to original EDID, according to an embodiment of the disclosure.

Referring to FIG. 17, in operation 1710, the display device 100 may detect an event preset for EDID restoration. EDID restoration means that modified EDID generated according to the above-described operation is restored to original EDID. That is, because EDID is stored in a memory to be accessed and read by the source device 500, EDID modification may mean that the display device 100 stores the modified EDID in the EDID memory to be accessed and read by the source device 500, and EDID restoration may mean that the display device 100 stores the original EDID again in the memory to be accessed and read by the source device 500.

The preset event for triggering EDID restoration may be an event indicating that content is no longer received from the source device 500 connected to the display device 100.

According to an embodiment of the disclosure, the event preset for EDID restoration may include an event indicating that disconnection of a cable for connecting the source device 500 to the display device 100 is detected. For example, the display device 100 may include a detector for detecting disconnection of the cable, and detect disconnection of the cable by using the detector. When disconnection of the cable for connecting the source device 500 to the display device 100 is detected as described above, it may be predicted that the connection to the source device 500 is terminated and content will be no longer received from the source device 500, the display device 100 may determine that the original EDID is to be restored without maintaining the modified EDID any longer.

According to an embodiment of the disclosure, the event preset for EDID restoration may include an event indicating that the display device 100 receives a power off input. For example, when the power off input is received from a user to terminate operation of the display device 100, the display device 100 may determine that the connection to the currently connected source device 500 is terminated, and determine that the original EDID is to be restored without maintaining the modified EDID any longer.

According to an embodiment of the disclosure, the event preset for EDID restoration may include an event indicating that the display device 100 enters a power management system. For example, for power management, the display device 100 may operate a display power management system for saving power of the display device 100 by cutting off power supplied to the display when a certain condition is satisfied. For example, when no user input is received for a certain time, the display device 100 may enter a display power management mode to cut off power supplied to the display. When the event indicating that the display device 100 enters the display power management system is detected as described above, the display device 100 may determine that the connection to the currently connected source device 500 is terminated, and determine that the original EDID is to be restored without maintaining the modified EDID any longer.

In operation 1720, the display device 100 may restore the original EDID in response to the detection of the event for EDID restoration. The restoration of the original EDID may mean that the original EDID is written instead of the modified EDID in the memory to be accessed and read by the source device 500. For example, in the example of FIG. 15 or 16, the controller 190 may remove the modified EDID 1500 or 1620 related to the HDMI port from the EDID memory 180, and write the original EDID 1610 related to the HDMI port in the EDID memory 180, thereby restoring the original EDID.

Figure 18:
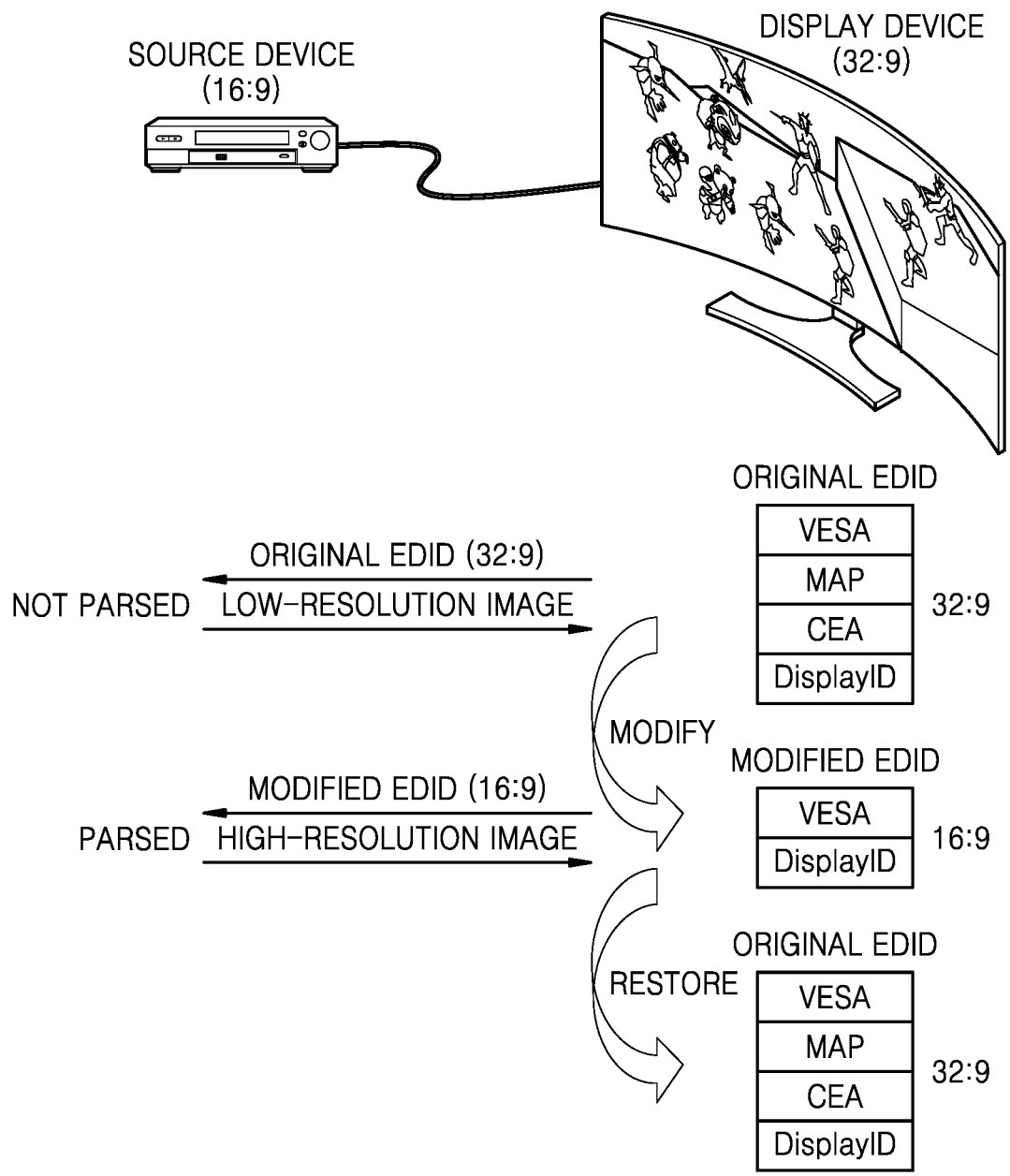
FIG. 18 shows an example of a scenario of modifying and then restoring original EDID, according to an embodiment of the disclosure.

FIG. 18 shows an example of a scenario of modifying and then restoring original EDID, according to an embodiment of the disclosure.

Referring to FIG. 18, the source device 500 supporting a 16:9 resolution may be connected through an HDMI cable to the display device 100 supporting a 32:9 resolution.

Due to the HDMI cable connection, the source device 500 may read 4-block original EDID from the display device 100. Because the display device 100 supports the 32:9 resolution, the 32:9 resolution may be written as preferred timing information of the original EDID.

However, the source device 500 such as an AV device may fail to parse the 4-block EDID and, in this case, the source device 500 may process an image in a low-resolution format due to the parsing failure, and output the image to the display device 100.

The display device 100 having received the low-resolution image may modify the 4-block EDID to 2-block EDID and modify the preferred timing information to the 16:9 resolution for the modified EDID.

The source device 500 may receive the EDID modified to the 2-block structure from the display device 100 again and, in this case, the source device 500 may succeed in parsing the 2-block EDID and thus process an image in a resolution higher than the low resolution. The source device 500 may process an image in a format based on the preferred timing information included in the modified EDID, i.e., the 16:9 resolution.

The display device 100 may receive the higher-resolution image from the source device 500 and output the image.

Then, when an event indicating that the connection to the source device 500 is terminated is detected, the display device 100 may return the 2-block modified EDID to the 4-block original EDID.

An embodiment of the disclosure may be implemented in the form of a recording medium including instructions executable by a computer, e.g., a program module executable by the computer. A computer-readable medium may be an arbitrary available medium that can be accessed by the computer, and examples thereof include all of volatile, non-volatile, detachable, and non-detachable media. The computer-readable medium may include a computer storage medium. Examples of the computer storage medium include all of volatile, non-volatile, detachable, and non-detachable media implemented using an arbitrary method or technology for storing information such as computer-readable instructions, data structures, program modules, or other data.

The afore-described embodiments of the disclosure may be implemented using a software program including instructions stored in a computer-readable storage medium.

The computer is a device capable of fetching instructions stored in a storage medium, and operating according to the embodiments of the disclosure based on the fetched instructions, and may include an electronic device according to the embodiments of the disclosure.

The computer-readable storage medium may be provided in the form of a non-transitory storage medium. When the storage medium is 'non-transitory', it means that the storage medium does not include signals and is tangible, and it does not limit that data is semi-permanently or temporarily stored in the storage medium.

A control method according to the embodiments of the disclosure may be included and provided in a computer program product. The computer program product may be traded between a seller and a purchaser.

The computer program product may include a software program, and a computer-readable storage medium having the software program stored therein. For example, the computer program product may include a product that is electronically distributed in the form of a software program (e.g., a downloadable application) via a manufacturer of a device or an electronic market (e.g., Google Play or App Store). For electronic distribution, at least a part of the software program may be stored in a storage medium or be temporarily generated. In this case, the storage medium may be a storage medium of a server of the manufacturer, a server of the electronic market, or a relay server that temporarily stores the software program.

The computer program product may include a storage medium of a server or a storage medium of a device in a system including the server and the device. Otherwise, when a third device (e.g., a smartphone) connected and communicating with the server or the device is present, the computer program product may include a storage medium of the third device. Alternatively, the computer program product may include a software program itself that is transmitted from the server to the device or the third device, or from the third device to the device.

In this case, one of the server, the device, and the third device may execute the computer program product to perform the method according to the embodiments of the disclosure. Alternatively, two or more of the server, the device, and the third device may execute the computer program product to perform the method according to the embodiments of the disclosure in a distributed fashion.

For example, the server (e.g., a cloud server or an artificial intelligence (AI) server) may execute the computer program product stored therein, to control the device communicatively connected to the server, to perform the method according to the embodiments of the disclosure.

As another example, the third device may execute the computer program product to control the device communicatively connected to the third device, to perform the method according to the embodiments of the disclosure. When the third device executes the computer program product, the third device may download the computer program product from the server and execute the downloaded computer program product. Alternatively, the third device may execute the computer program product provided in a preloaded state, to perform the method according to the embodiments of the disclosure.

As used herein, the term "unit" may indicate a hardware component such as a processor or a circuit, and/or a software component executed by the hardware component such as the processor.

The above descriptions of the disclosure are provided for the purpose of illustration, and it will be understood by one of ordinary skill in the art that various changes in form and details may be made therein without departing from the scope of the disclosure. Therefore, it should be understood that the embodiments of the disclosure described herein should be considered in a descriptive sense only and not for purposes of limitation. For example, each component described to be of a single type can be implemented in a distributed manner and, likewise, components described as being distributed can be implemented in a combined manner.

The scope of the disclosure is defined by the following claims rather than by the detailed description, and it should be understood that all modifications from the claims and their equivalents are included in the scope of the disclosure.

What is claimed is:

1. An electronic device comprising:
a receiver configured to receive information including an input image from a source device;
a memory storing one or more instructions; and
a processor configured to execute the one or more instructions stored in the memory to:
detect a first resolution of the input image received from the source device;
determine whether to modify an extended display identification data (EDID) of the electronic device, based on whether the detected first resolution corresponds to at least one supported resolution associated with the EDID of the electronic device;
upon determining that the EDID is to be modified, modify the EDID by changing a number of data blocks comprised in the EDID, to a preset number; and
receive, from the source device, an input image of a second resolution, generated based on the modified EDID.

2. The electronic device of claim 1, wherein the processor is further configured to execute the one or more instructions to:
upon determining that the detected first resolution does not correspond to the at least one supported resolution associated with the EDID, determine that the EDID is to be modified; and
upon determining that the detected first resolution corresponds to the at least one supported resolution associated with the EDID, output the received input image of the first resolution on a display without modifying the EDID.

3. The electronic device of claim 1, wherein the EDID comprises a base EDID block and one or more EDID extension blocks, and
wherein the processor is further configured to execute the one or more instructions to change the number of data blocks comprised in the EDID, to the preset number, by removing one or more EDID extension blocks from among the data blocks comprised in the EDID.

4. The electronic device of claim 3, wherein the processor is further configured to execute the one or more instructions to generate an updated base EDID block by modifying a first preferred resolution information written in the base EDID block, to a second preferred resolution information.

5. The electronic device of claim 4, wherein a value of a data field comprised in the updated base EDID block and indicating a number of EDID extension blocks that are changed when the one or more EDID extension blocks are removed.

6. The electronic device of claim 1, wherein the processor is further configured to execute the one or more instructions to:
upon completing modification of the EDID, provide, to the source device, a state signal for controlling the source device to read the modified EDID; and
upon receiving an EDID request from the source device, receive, from the source device, the input image of the second resolution, generated based on the modified EDID, by providing the modified EDID to the source device.

7. The electronic device of claim 1, wherein the processor is further configured to execute the one or more instructions to, upon receiving the input image of the second resolution from the source device, release a display screen mute state and display the received input image of the second resolution on a display.

8. The electronic device of claim 1, wherein the processor is further configured to execute the one or more instructions to, upon detecting a preset event, restore the modified EDID to the EDID.

9. The electronic device of claim 8, wherein the preset event comprises at least one of disconnection of a cable for connecting the source device to the electronic device, entry to a power management mode, or reception of a power off input.

10. The electronic device of claim 1, wherein the input image of the first resolution, received from the source device, is generated by processing an image based on the first resolution set by default when the source device having read the EDID fails to parse the EDID.

11. The electronic device of claim 1, wherein the processor is further configured to execute the one or more instructions to:
determine that the EDID is not to be modified, when it is determined that the detected first resolution corresponds to the at least one supported resolution associated with the EDID; and
release a display screen mute state and display the received input image of the first resolution on a display.

12. The electronic device of claim 1, wherein the first resolution indicates a low resolution comprising at least one of 480p or 576p, and the second resolution is higher than the first resolution.

13. The electronic device of claim 1, wherein the at least one supported resolution associated with the EDID is a first preferred resolution, and
the processor is further configured to execute the one or more instructions to:
determine to modify the extended display identification data (EDID) of the electronic device, based on the detected first resolution not corresponding to the first preferred resolution.

14. The electronic device of claim 13, wherein the processor is further configured to execute the one or more instructions to:
modify the EDID by modifying the first preferred resolution to a second preferred resolution.

15. The electronic device of claim 14, wherein the EDID comprises a base EDID block and one or more EDID extension blocks, and
wherein the processor is further configured to execute the one or more instructions to change a number of data blocks comprised in the EDID, to the preset number, by removing one or more EDID extension blocks from among the data blocks comprised in the EDID.

16. The electronic device of claim 15, wherein the processor is further configured to execute the one or more instructions to generate an updated base EDID block by modifying the first preferred resolution written in the base EDID block, to a second preferred resolution.

17. An operating method of an electronic device, the operating method comprising:
detecting a first resolution of an input image received from a source device;
determining whether to modify an extended display identification data (EDID) of the electronic device, based on whether the detected first resolution corresponds to at least one supported resolution associated with the EDID of the electronic device;
upon determining that the EDID is to be modified, modifying the EDID y changing a number of data blocks comprised in the EDID, to a preset number; and
receiving, from the source device, an input image of a second resolution, generated based on the modified EDID.

18. The operating method of claim 17, further comprising:
upon determining that the detected first resolution does not correspond to the at least one supported resolution associated with the EDID, determining that the EDID is to be modified; and
upon determining that the detected first resolution corresponds to the at least one supported resolution associated with the EDID, outputting the received input image of the first resolution on a display without modifying the EDID.

19. The operating method of claim 17, wherein the EDID comprises a base EDID block and one or more EDID extension blocks, and
wherein the method further comprises changing the number of data blocks comprised in the EDID, to the preset number, by removing one or more EDID extension blocks from among the data blocks comprised in the EDID.

20. The operating method of claim 19, further comprising generating an updated base EDID block by modifying a first preferred resolution information written in the base EDID block, to a second preferred resolution information.

21. The operating method of claim 17, further comprising:
upon completing modification of the EDID, providing, to the source device, a state signal for controlling the source device to read the modified EDID; and
upon receiving an EDID request from the source device, receiving, from the source device, the input image of the second resolution, generated based on the modified EDID, by providing the modified EDID to the source device.

22. The operating method of claim 17, wherein the at least one supported resolution associated with the EDID is a first preferred resolution, and the operating method further comprises:
determining to modify the extended display identification data (EDID) of the electronic device, based on the detected first resolution not corresponding to the first preferred resolution.

23. The operating method of claim 22, further comprising: modifying the EDID by modifying the first preferred resolution to a second preferred resolution.

24. The operating method of claim 23, wherein the EDID comprises a base EDID block and one or more EDID extension blocks, and the operating method comprises:
changing a number of data blocks comprised in the EDID, to the preset number, by removing one or more EDID extension blocks from among the data blocks comprised in the EDID.

25. The operating method of claim 24, further comprising: generating an updated base EDID block by modifying the first preferred resolution written in the base EDID block, to a second preferred resolution.

26. A non-transitory computer-readable recording medium having recorded thereon one or more programs executed by a processor of an electronic device to implement an operating method of the electronic device, the operating method comprising:
detecting a first resolution of an input image received from a source device;
determining whether to modify an extended display identification data (EDID) of the electronic device, based on whether the detected first resolution corresponds to at least one supported resolution associated with the EDID of the electronic device;
upon determining that the EDID is to be modified, modifying the EDID changing a number of data blocks comprised in the EDID, to a preset number; and
receiving, from the source device, an input image of a second resolution, generated based on the modified EDID.

27. The non-transitory computer-readable recording medium of claim 26, wherein the at least one supported resolution associated with the EDID is a first preferred resolution, and the operating method comprising:
determining to modify the extended display identification data (EDID) of the electronic device, based on the detected first resolution not corresponding to the first preferred resolution.

\* \* \* \* \*

UNITED STATES PATENT AND TRADEMARK OFFICE
CERTIFICATE OF CORRECTION

| | |
|---|---|
| PATENT NO. | : 11,882,331 B2 |
| APPLICATION NO. | : 17/727150 |
| DATED | : January 23, 2024 |
| INVENTOR(S) | : Byoungjin Choi |

It is certified that error appears in the above-identified patent and that said Letters Patent is hereby corrected as shown below:

In the Claims

Column 28, Line 35:
In Claim 17, delete "y" and insert --by--.

Column 30, Line 12:
In Claim 26, after "EDID" insert --by--.

Signed and Sealed this
Fifth Day of March, 2024

Katherine Kelly Vidal
*Director of the United States Patent and Trademark Office*